(12) United States Patent
Kondo et al.

(10) Patent No.: US 10,839,248 B2
(45) Date of Patent: Nov. 17, 2020

(54) INFORMATION ACQUISITION APPARATUS AND INFORMATION ACQUISITION METHOD

(71) Applicant: Sony Corporation, Tokyo (JP)

(72) Inventors: Yuhi Kondo, Tokyo (JP); Yasutaka Hirasawa, Tokyo (JP); Hideki Oyaizu, Tokyo (JP); Taketo Akama, Tokyo (JP); Suguru Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 15/761,846

(22) PCT Filed: Aug. 30, 2016

(86) PCT No.: PCT/JP2016/075294
§ 371 (c)(1),
(2) Date: Mar. 21, 2018

(87) PCT Pub. No.: WO2017/056821
PCT Pub. Date: Apr. 6, 2017

(65) Prior Publication Data
US 2018/0268246 A1      Sep. 20, 2018

(30) Foreign Application Priority Data

Sep. 30, 2015   (JP) ................................. 2015-193299

(51) Int. Cl.
*G06K 9/46*  (2006.01)
*G03B 15/00*  (2006.01)
(Continued)

(52) U.S. Cl.
CPC ........... *G06K 9/4661* (2013.01); *G01C 3/085* (2013.01); *G01C 3/14* (2013.01); *G01S 17/89* (2013.01);
(Continued)

(58) Field of Classification Search
CPC .. G06K 9/4661; G06K 9/00201; G06K 9/209; G06K 9/6201; G06K 9/00805;
(Continued)

(56) References Cited

U.S. PATENT DOCUMENTS

| | | | |
|---|---|---|---|
| 2007/0222781 A1* | 9/2007 | Kondo | G06T 15/506 345/426 |
| 2008/0186390 A1* | 8/2008 | Sato | G06T 3/4053 348/222.1 |

(Continued)

FOREIGN PATENT DOCUMENTS

| | | |
|---|---|---|
| JP | 2004-069583 A | 3/2004 |
| JP | 2006-199055 A | 8/2006 |

(Continued)

OTHER PUBLICATIONS

Written Opinion and English translation thereof dated Nov. 8, 2016 in connection with International Application No. PCT/JP2016/075294.

(Continued)

*Primary Examiner* — Carol Wang
(74) *Attorney, Agent, or Firm* — Wolf, Greenfield & Sacks, P.C.

(57) ABSTRACT

A polarized image acquisition unit 20 acquires polarized images in a plurality of polarization directions. A reflection information generation unit 30 generates reflection information indicating reflection components from the polarized images in the plurality of polarization directions acquired by the polarized image acquisition unit 20. A reflection information using unit 40 uses the reflection information generated by the reflection information generation unit 30 to acquire an image of a viewed object appearing in the polarized images. A depth estimation unit estimates a depth value of a reflective surface area and acquires a position of the viewed object on the basis of an image of the viewed (Continued)

object appearing in the reflective surface area and the estimated depth value. Therefore, the viewed object positioned in, for example, an area of a blind spot can be easily checked.

11 Claims, 25 Drawing Sheets

(51) Int. Cl.

| | |
|---|---|
| *G01S 17/89* | (2020.01) |
| *G08G 1/16* | (2006.01) |
| *G06T 7/55* | (2017.01) |
| *H04N 5/225* | (2006.01) |
| *G06K 9/00* | (2006.01) |
| *G06K 9/62* | (2006.01) |
| *G06K 9/20* | (2006.01) |
| *H04N 5/222* | (2006.01) |
| *G01C 3/08* | (2006.01) |
| *G01C 3/14* | (2006.01) |
| *G06T 7/50* | (2017.01) |
| *G02B 5/30* | (2006.01) |
| *G02B 5/20* | (2006.01) |
| *G03B 5/00* | (2006.01) |
| *G02B 3/00* | (2006.01) |
| *H04N 7/18* | (2006.01) |

(52) U.S. Cl.
CPC ........... *G02B 5/3066* (2013.01); *G03B 15/00* (2013.01); *G06K 9/00201* (2013.01); *G06K 9/00805* (2013.01); *G06K 9/209* (2013.01); *G06K 9/6201* (2013.01); *G06T 7/50* (2017.01); *G06T 7/55* (2017.01); *G08G 1/167* (2013.01); *H04N 5/2226* (2013.01); *H04N 5/2254* (2013.01); *G02B 3/0056* (2013.01); *G02B 5/201* (2013.01); *G02B 5/30* (2013.01); *G03B 5/00* (2013.01); *G06T 2207/30261* (2013.01); *H04N 7/183* (2013.01)

(58) Field of Classification Search
CPC .... H04N 5/2226; H04N 5/2254; H04N 7/183; G06T 7/50; G06T 7/55; G06T 2207/30261; G08G 1/167; G01S 17/89; G01S 17/894; G03B 15/00; G03B 5/00; G02B 3/0056; G02B 5/30; G02B 5/3066; G02B 5/201; G01C 3/14; G01C 3/085
See application file for complete search history.

(56) References Cited

U.S. PATENT DOCUMENTS

| | | | |
|---|---|---|---|
| 2009/0135183 A1* | 5/2009 | Sato | G01B 11/002 345/426 |
| 2010/0303344 A1* | 12/2010 | Sato | H04N 9/045 382/162 |
| 2012/0200705 A1 | 8/2012 | Saigusa et al. | |
| 2014/0184800 A1 | 7/2014 | Hirai et al. | |
| 2016/0098614 A1* | 4/2016 | Yamanashi | G06K 9/4661 348/135 |

FOREIGN PATENT DOCUMENTS

| | | |
|---|---|---|
| JP | 2010-122821 A | 6/2010 |
| JP | 2011-002718 A | 1/2011 |
| JP | 2012-162211 A | 8/2012 |
| JP | 2013-031054 A | 2/2013 |

OTHER PUBLICATIONS

International Preliminary Report on Patentability and English translation thereof dated Apr. 12, 2018 in connection with International Application No. PCT/JP2016/075294.

International Search Report and English translation thereof dated Nov. 8, 2016 in connection with International Application No. PCT/JP2016/075294.

\* cited by examiner

F I G . 1
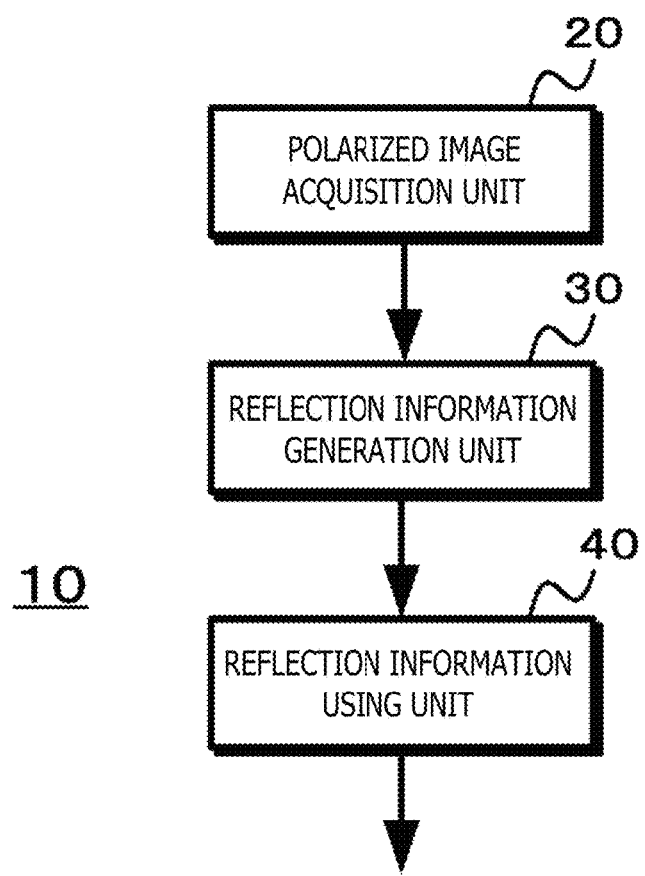

FIG. 2
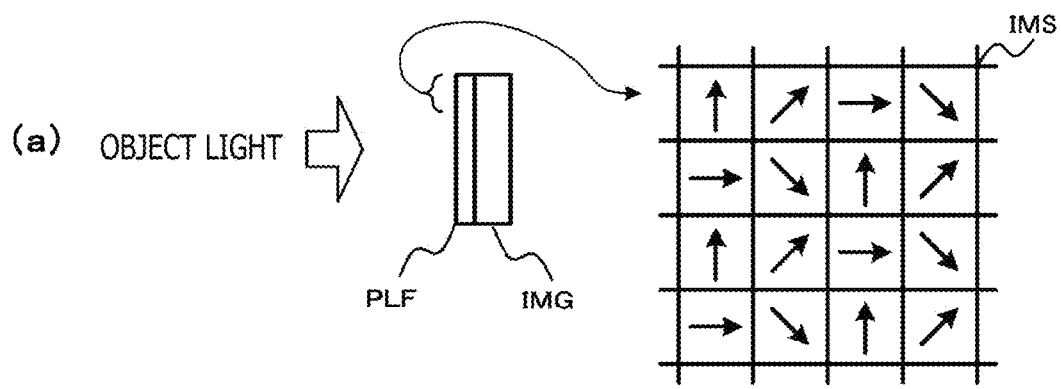
(a) OBJECT LIGHT
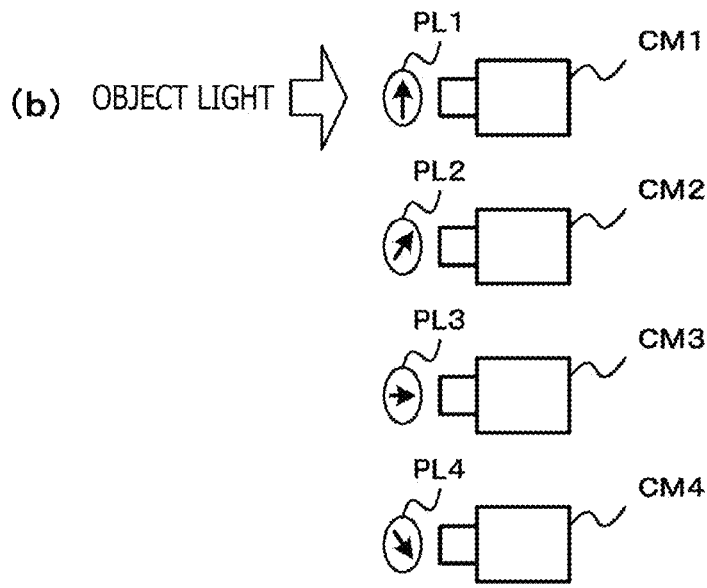
(b) OBJECT LIGHT
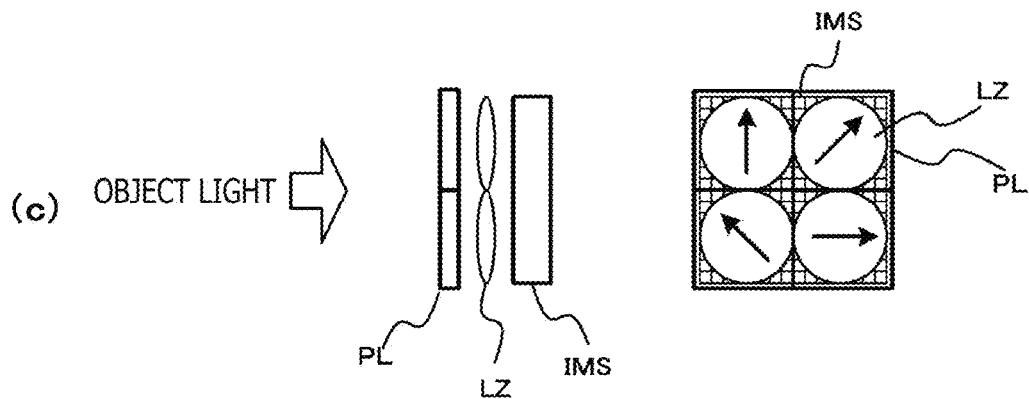
(c) OBJECT LIGHT

INFORMATION ACQUISITION APPARATUS AND INFORMATION ACQUISITION METHOD

CROSS-REFERENCE TO RELATED APPLICATIONS

This application claims the benefit under 35 U.S.C. § 371 as a U.S. National Stage Entry of International Application No. PCT/JP2016/075294, filed in the Japanese Patent Office as a Receiving Office on Aug. 30, 2016, which claims priority to Japanese Patent Application Number JP2015-193299, filed in the Japanese Patent Office on Sep. 30, 2015, each of which is hereby incorporated by reference in its entirety.

TECHNICAL FIELD

This technique relates to an information acquisition apparatus and an information acquisition method. More specifically, the technique enables to use reflection components from images of a surrounding area to acquire object information.

BACKGROUND ART

Conventionally, a polarizing filter is arranged on an imaging device to acquire polarization information. Furthermore, the polarization information is used to obtain a desired image. For example, it is disclosed in PTL 1 that a polarizing filter is used to reduce the influence of illumination light or sunlight reflected by a windshield of a vehicle to allow picking up an image of a person such as a driver in the vehicle.

CITATION LIST

Patent Literature

[PTL 1]
   JP 2011-002718A

SUMMARY

Technical Problem

Incidentally, in a case where the polarization information is used to obtain a desired image, reflection components are often removed. However, the reflection components may include information of a viewed object in a blind spot area, and the reflection components may be useful information for, for example, the driver of the vehicle.

Accordingly, an object of the technique is to provide an information acquisition apparatus and an information acquisition method that use reflection components from images of a surrounding area to acquire information of a viewed object.

Solution to Problem

A first aspect of the technique provides an information acquisition apparatus including
   a reflection information generation unit that generates reflection information indicating reflection components from polarized images in a plurality of polarization directions, and
   a reflection information using unit that uses the reflection information to acquire information of a viewed object appearing in the polarized images.

In the technique, the reflection information generation unit generates the reflection information indicating the reflection components from the polarized images in the plurality of polarization directions. For example, the reflection information generation unit sets a concentrated area with a degree of polarization equal to or greater than a threshold as a reflective surface area and generates a reflection image that is an image of the reflective surface area. The reflection information using unit uses the reflection information to acquire the information of the viewed object appearing in the polarized images. For example, the reflection information using unit uses the reflection image to perform object recognition and acquires an image of the viewed object. Furthermore, the reflection information includes azimuth information of the reflective surface area, and the reflection information using unit displays a direction of the reflective surface area along with the image of the viewed object on the basis of the azimuth information.

Furthermore, the reflection information using unit uses reflection information of the corresponding viewed object in a corresponding reflective surface area from the plurality of viewpoints and an estimated distance of the corresponding reflective surface area to acquire the position of the corresponding viewed object. Furthermore, a depth estimation unit that estimates the distance of the reflective surface area on the basis of the polarized images from the plurality of viewpoints is further provided. The depth estimation unit uses images excluding reflection components from the polarized images from the plurality of viewpoints to estimate the distance of the reflective surface area for each of the polarized images. In addition, the reflection information using unit uses a distance of each of a plurality of reflective surface areas and reflection information of each of the plurality of reflective surface areas generated by the reflection information generation unit to acquire the position of the viewed object appearing in the plurality of reflective surface areas. Furthermore, the reflection information using unit uses the distance of the reflective surface area at each of a plurality of points in time and the reflection information of the reflective surface area at each of the plurality of points in time generated by the reflection information generation unit to acquire the position of the viewed object appearing in the reflective surface areas at the plurality of points in time. Here, in a case where a polarized image acquisition unit that acquires the polarized images including the reflective surface area moves with time to acquire the polarized images at the plurality of points in time, the reflection information using unit uses the estimated distance of the reflective surface area with the position of the polarized image acquisition unit at a predetermined point in time as a reference, the position of the polarized image acquisition unit at a different point in time with respect to the position of the polarized image acquisition unit at the predetermined point in time, and the reflection information of the reflective surface area at each of the plurality of points in time generated by the reflection information generation unit to acquire the position of the viewed object appearing in the reflective surface areas at the plurality of points in time. In a case where the reflective surface area moves with time, the reflection information using unit uses the estimated distance of the reflective surface area at each of the plurality of points in time and the reflection information of the reflective surface area at each of the plurality of points in time generated by the reflection information generation unit to acquire the position of the viewed object appearing in the reflective surface areas.

A second aspect of the technique provides an information acquisition method including generating, by a reflection information generation unit, reflection information indicating reflection components from polarized images in a plurality of polarization directions, and acquiring, by a reflection information using unit, information of a viewed object appearing in the polarized images by using the reflection information.

Advantageous Effects of Invention

According to the technique, the reflection information generation unit generates the reflection information indicating the reflection components from the polarized images in a plurality of polarization directions. Furthermore, the reflection information using unit uses the reflection information to acquire the information of the viewed object appearing in the polarized images. Therefore, the reflection components can be used from the images of the surrounding area to easily check the viewed object positioned in, for example, an area of a blind spot. Note that the advantageous effects described in the present specification are exemplary only and not limiting, and there can be additional advantageous effects.

BRIEF DESCRIPTION OF DRAWINGS

FIG. 1 is a diagram illustrating a configuration of a first embodiment.

FIG. 2 is a diagram for describing a polarized image acquired by a polarized image acquisition unit.

DESCRIPTION OF EMBODIMENTS

Hereinafter, embodiments of the present technique will be described. Note that the embodiments are described in the following order.
1. First Embodiment
2. Second Embodiment
3. Third Embodiment
4. Fourth Embodiment
5. Other Embodiments
6. Application Example of Information Acquisition Apparatus 1. First Embodiment FIG. 1 illustrates a configuration of a first embodiment of an information acquisition apparatus. An information acquisition apparatus 10 includes a polarized image acquisition unit 20, a reflection information generation unit 30, and a reflection information using unit 40.

The polarized image acquisition unit 20 acquires a plurality of polarized images in different polarization directions, such as polarized images in three or more polarization directions. FIG. 2 is a diagram for describing the polarized images acquired by the polarized image acquisition unit 20. For example, as depicted in (a) of FIG. 2, a polarizing filter PLF with a pixel configuration in three or more polarization directions is arranged on an image sensor IMS to pick up and generate a plurality of polarized images in different polarization directions. Note that in the case illustrated in (a) of FIG. 2, the polarizing filter PLF arranged on an incident surface of the image sensor IMS converts the repective pixels into pixels in four different types of polarization directions (polarization directions are indicated by arrows). In addition, as depicted in (b) of FIG. 2, polarizing plates PL1 to PL4 in different polarization directions may be provided in front of cameras CM1 to CM4, and the cameras CM1 to CM4 may pick up and generate a plurality of polarized images in different polarization directions. Furthermore, as depicted in (c) of FIG. 2, a configuration of a multi-lens array may also be used to generate a plurality of polarized images in different polarization directions. For example, a plurality of lenses LZ (four in FIG. 2) are provided on a front surface of the image sensor IMS, and each lens LZ forms an optical image of an object on an imaging surface of the image sensor IMS, individually. Furthermore, the polarizing plates PL are provided on front surfaces of the respective lenses LZ, and the polarization directions of the polarizing plates PL are different directions. According to the configuration, the image sensor IMS can generate polarized images in different polarization directions. The polarized image acquisition unit 20 outputs, to the reflection information generation unit 30, the polarized images in three or more polarization directions acquired by such a configuration. Note that image sensors or cameras may be separately provided on the polarized image acquisition unit 20, and image signals may be acquired from the image sensors or the cameras to output the polarized images in three or more polarization directions to the reflection information generation unit 30.

Figure 3:
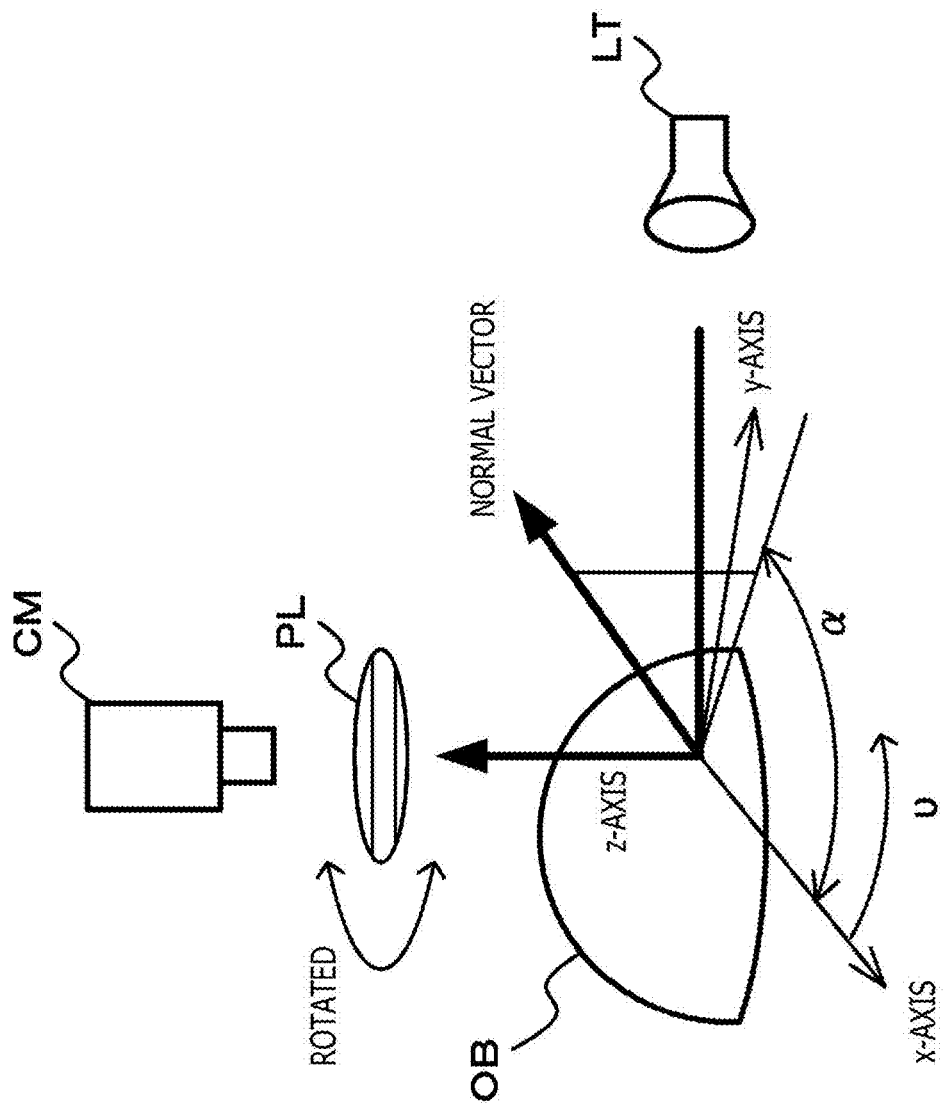
FIG. 3 is a diagram for describing a shape of an object and the polarized image.

The reflection information generation unit 30 generates reflection information from the plurality of polarized images in different polarization directions. Here, the shape of the object and the polarized images will be described with reference to FIG. 3. For example, a light source LT is used to illuminate an object OB, and the camera CM images the object OB through the polarizing plate PL. In this case, the luminance of the object OB varies in the photographed images according to the polarization direction of the polarizing plate PL. Note that, to facilitate the description, the polarizing plate PL is rotated to pick up images to acquire a plurality of polarized images, for example. The highest luminance will be defined as Imax, and the lowest luminance will be defined as Imin. Furthermore, the angle of the y-axis direction with respect to the x-axis when the polarizing plate PL is rotated will be defined as an angle of polarization υ, in which the x-axis and the y-axis in the two-dimensional coordinates are on the plane of the polarizing plate PL.

Figure 4:
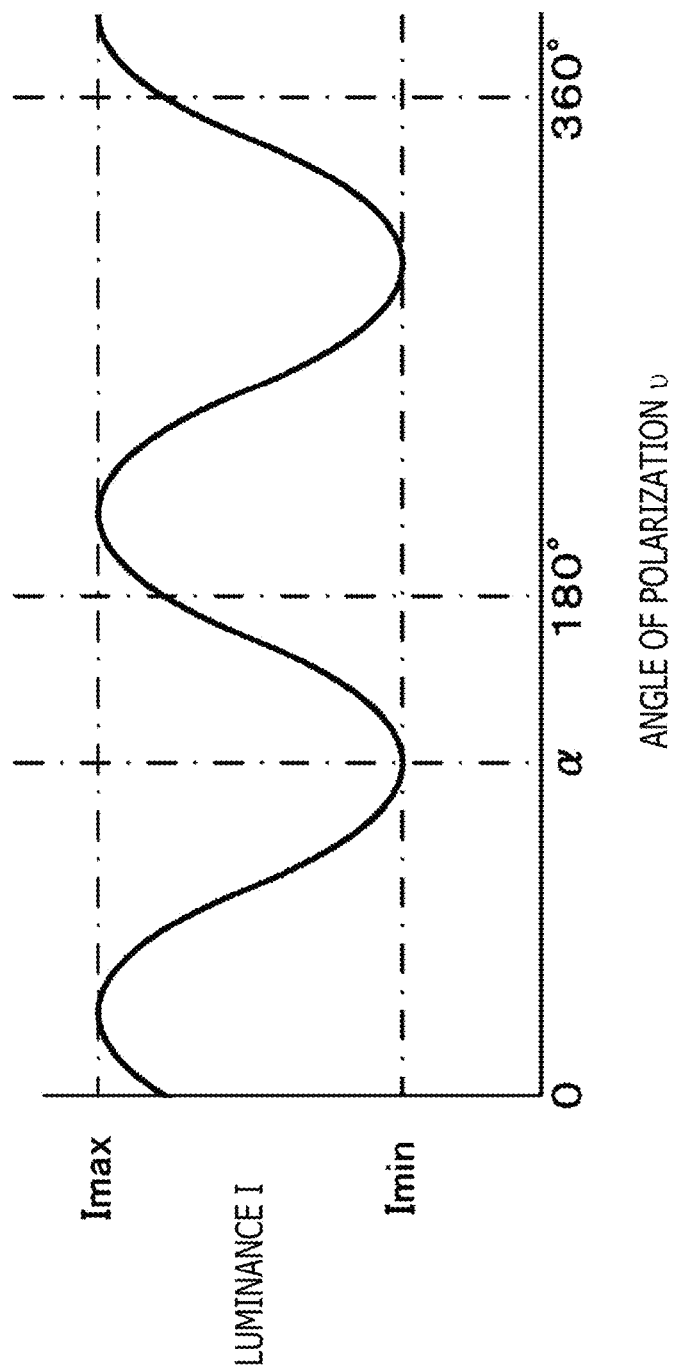
FIG. 4 is a diagram illustrating a relationship between luminance and an angle of polarization.

When the polarizing plate PL is rotated 180 degrees, the polarizing plate PL returns to the original polarization state, and the polarizing plate PL has a 180 degree cycle. Furthermore, the angle of polarization υ when the maximum luminance Imax is observed will be defined as an azimuth α. By performing such definition, the luminance I observed when the polarizing plate PL is rotated can be expressed as in Formula (1). Note that FIG. 4 illustrates a relationship between the luminance and the angle of polarization. In the technique, specular reflection is used to acquire information of a viewed object in a blind spot area. In the case of the specular reflection, the azimuth is deviated by 90 degrees with respect to the angle of polarization, and the azimuth is 90 degrees plus or minus the angle of polarization. Therefore, as depicted in FIG. 4, the azimuth α is obtained at a part of the minimum luminance Imin that is the lower limit of the luminance. Furthermore, the difference (Imax−Imin) between the maximum luminance Imax and the minimum luminance Imin is a reflection component.

[Math. 1]

$$I = \frac{I_{max} + I_{min}}{2} + \frac{I_{max} - I_{min}}{2} \cos(2v - 2\phi) \quad (1)$$

In Formula (1), the angle of polarization υ is clear at the generation of the polarized images, and the maximum luminance Imax, the minimum luminance Imin, and the azimuth α are variables. Therefore, the luminance of the polarized images in three or more polarization directions can be used and fitted into the model equation indicated in Formula (1) to determine the azimuth α that is the angle of polarization with the maximum luminance on the basis of the model equation indicating the relationship between the luminance and the angle of polarization.

The azimuth α is the angle of the y-axis direction with respect to the x-axis direction as described above. Here, when the minimum luminance Imin and the maximum luminance Imax are obtained by rotating the polarizing plate PL, a degree of polarization ρ can be calculated on the basis of Formula (2).

[Math. 2]

$$\rho = \frac{I_{max} - I_{min}}{I_{max} + I_{min}} \quad (2)$$

The reflection information generation unit 30 calculates the model equation indicated in Formula (1) for each pixel of the polarized images in three or more polarization directions. Furthermore, the reflection information generation unit 30 also extracts a reflective surface area that is a concentrated area where pixels are concentrated, in which in the pixels, the degree of polarization ρ indicated in Formula (2) is equal to or greater than a preset threshold. The reflection information generation unit 30 further calculates the difference (Imax−Imin) between the maximum luminance Imax and the minimum luminance Imin for each pixel of the extracted reflective surface area and sets the difference as a reflection component. The reflection information generation section 30 generates the reflection information, such as reflection information indicating the reflective surface area, the reflection component, and the azimuth, from the polarized images in three or more polarization directions and outputs the reflection information to the reflection information using unit 40.

The reflection information using unit 40 uses the reflection information generated by the reflection information generation unit 30 to obtain presentation information, control information, and the like. For example, the reflection information using unit 40 presents the user with a reflection image that is an image indicating reflection components. The reflection information using unit 40 may also present the user with, along with the image of the reflective surface area, a direction indicator indicating in which direction the reflective surface area is facing on the basis of the azimuth of the reflective surface area. The reflection information using unit 40 may also use the reflection information to acquire position information of the viewed object as information usable for controlling the drive of the vehicle and the like.

Figure 5:
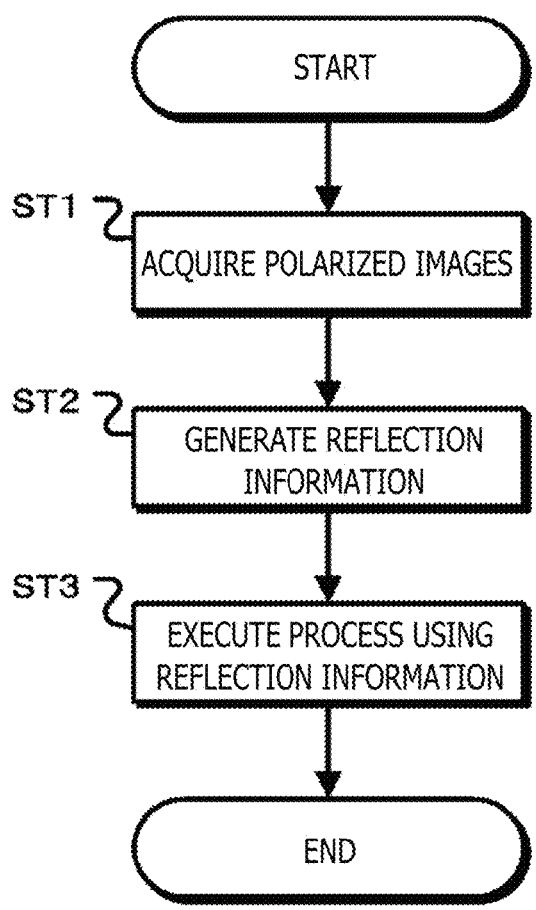
FIG. 5 is a flow chart depicting an operation of the first embodiment.

Next, an operation of the first embodiment will be described. FIG. 5 is a flow chart depicting an operation of the first embodiment. In step ST1, the information acquisition apparatus acquires polarized images. The polarized image acquisition unit 20 of the information acquisition apparatus 10 acquires the polarized images in three or more polarization directions generated by using the polarizing filter or the polarizing plate and proceeds to step ST2.

Figure 6:
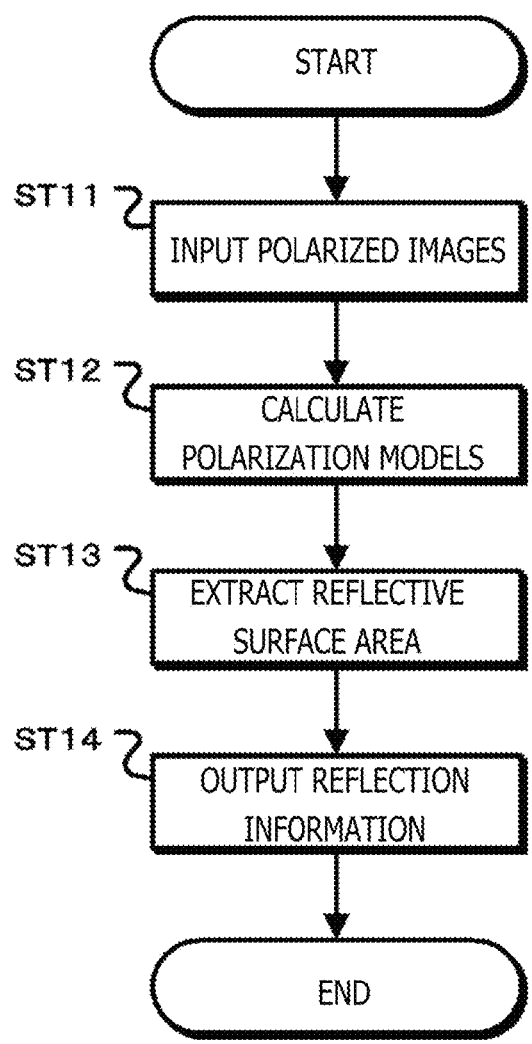
FIG. 6 is a flow chart depicting an operation of a reflection information generation unit.

In step ST2, the information acquisition apparatus generates reflection information. The reflection information generation unit 30 of the information acquisition apparatus uses the polarized images acquired in step ST1 to generate the reflection information. FIG. 6 is a flow chart depicting an operation of the reflection information generation unit 30.

In step ST11, the reflection information generation unit inputs polarized images. The reflection information generation unit 30 inputs the polarized images acquired by the polarized image acquisition unit 20 and proceeds to step ST12.

In step ST12, the reflection information generation unit calculates a polarization model. The reflection information generation unit 30 uses the polarized images in three or more polarization directions and fits each pixel into the model equation indicated in Formula (1) to calculate the polarization model and the degree of polarization for each pixel. The reflection information generation unit 30 proceeds to step ST13.

In step ST13, the reflection information generation unit extracts a reflective surface area. The reflection information generation unit 30 extracts the reflective surface area that is the concentrated area where pixels are concentrated, in which in the pixels, the degree of polarization is equal to or greater than the preset threshold. The reflection information generation unit 30 proceeds to step ST14.

In step ST14, the reflection information generation unit outputs reflection information. The reflection information generation unit 30 calculates the reflection component for each pixel of the reflective surface area extracted in step ST13 and outputs the reflection components of the reflective surface area as the reflection information. Furthermore, the reflection information generation unit 30 may include, in the reflection information, the information indicating the azimuth calculated on the basis of the model equation or the like for each pixel of the reflective surface area and indicting the position of the reflective surface area.

Figure 7:
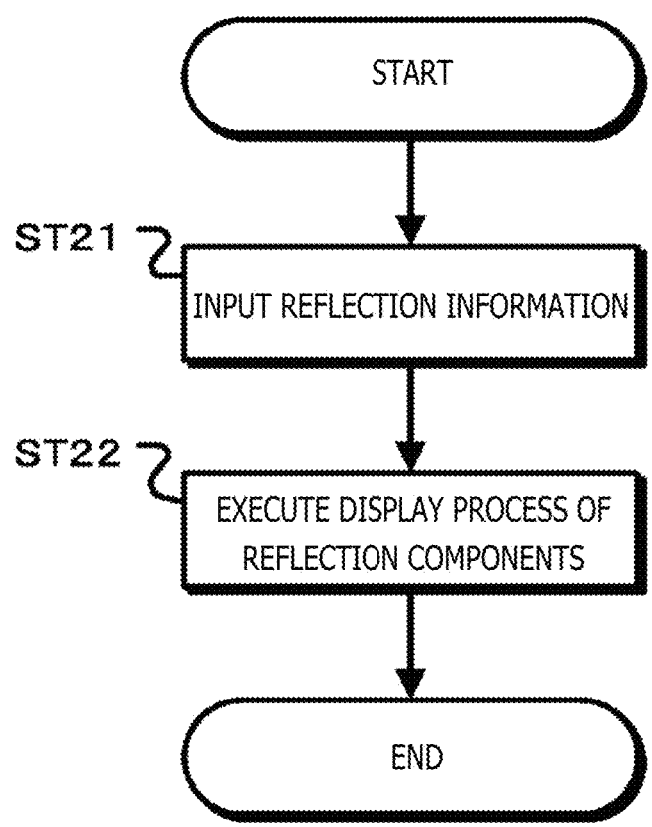
FIG. 7 is a flow chart depicting an example of a process using reflection information.

Returning to FIG. 5, a process using reflection information is executed in step ST3. FIG. 7 is a flow chart depicting an example of the process using the reflection information. In step ST21, the reflection information using unit inputs reflection information. The reflection information using unit 40 inputs the reflection information generated by the reflection information generation unit 30 and proceeds to step ST22.

In step ST22, the reflection information using unit executes a display process of reflection components. The reflection information using unit 40 displays the reflection component image that is an image indicating the reflection components of the reflective surface area on the basis of the reflection information. Furthermore, in a case where the reflection information includes the information of the azimuth, the reflection information using unit 40 uses an arrow or the like to display, along with the reflection component image, the azimuth of the reflective surface area, that is, the direction of the object appearing in the reflective surface area. Note that the area for displaying the reflection components is not limited to the entire reflective surface area. For example, the reflection component image of an area selected by the user may be displayed. Furthermore, the reflection information using unit 40 may display an area with the degree of polarization greater than the average degree of polarization in the reflective surface area or may display an area with the maximum degree of polarization.

Figure 8:
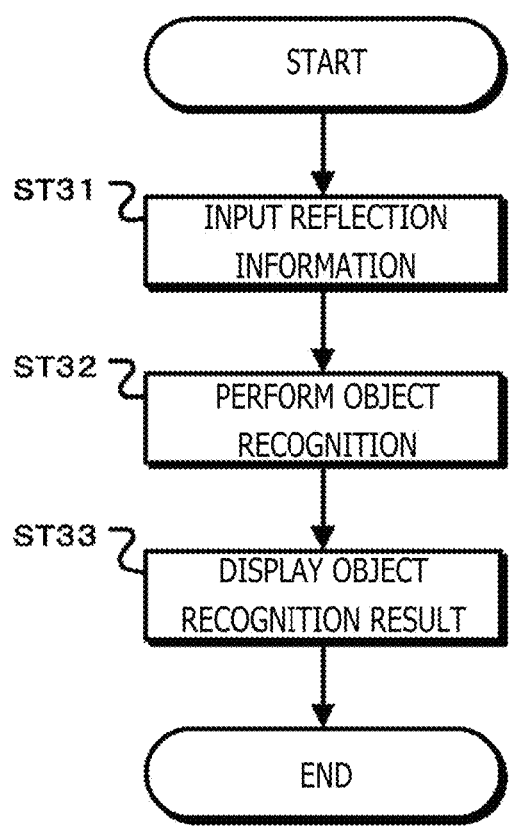
FIG. 8 is a flow chart depicting another example of the process using the reflection information.

FIG. 8 is a flow chart depicting another example of the process using the reflection information. In step ST31, the reflection information using unit inputs reflection information. The reflection information using unit 40 inputs the reflection information generated by the reflection information generation unit 30 and proceeds to step ST32.

In step ST32, the reflection information using unit performs object recognition. The reflection information using unit 40 determines, on the basis of the reflection information, the kind of object in the reflection component image that is an image indicating the reflection components of the reflective surface area. More specifically, the reflection information using unit 40 performs the object recognition to determine a person, a bicycle, a motorcycle, an automobile, or the like appearing in the reflective surface area and proceeds to step ST33.

In step ST33, the reflection information using unit displays an object recognition result. The reflection information using unit 40 displays the image of a person, a bicycle, a motorcycle, an automobile, or the like recognized in the object recognition. Furthermore, in a case where the information of the azimuth is included in the reflection information, the reflection information using unit 40 uses an arrow or the like to display the direction of the determined object along with the image of the object.

Figure 9:
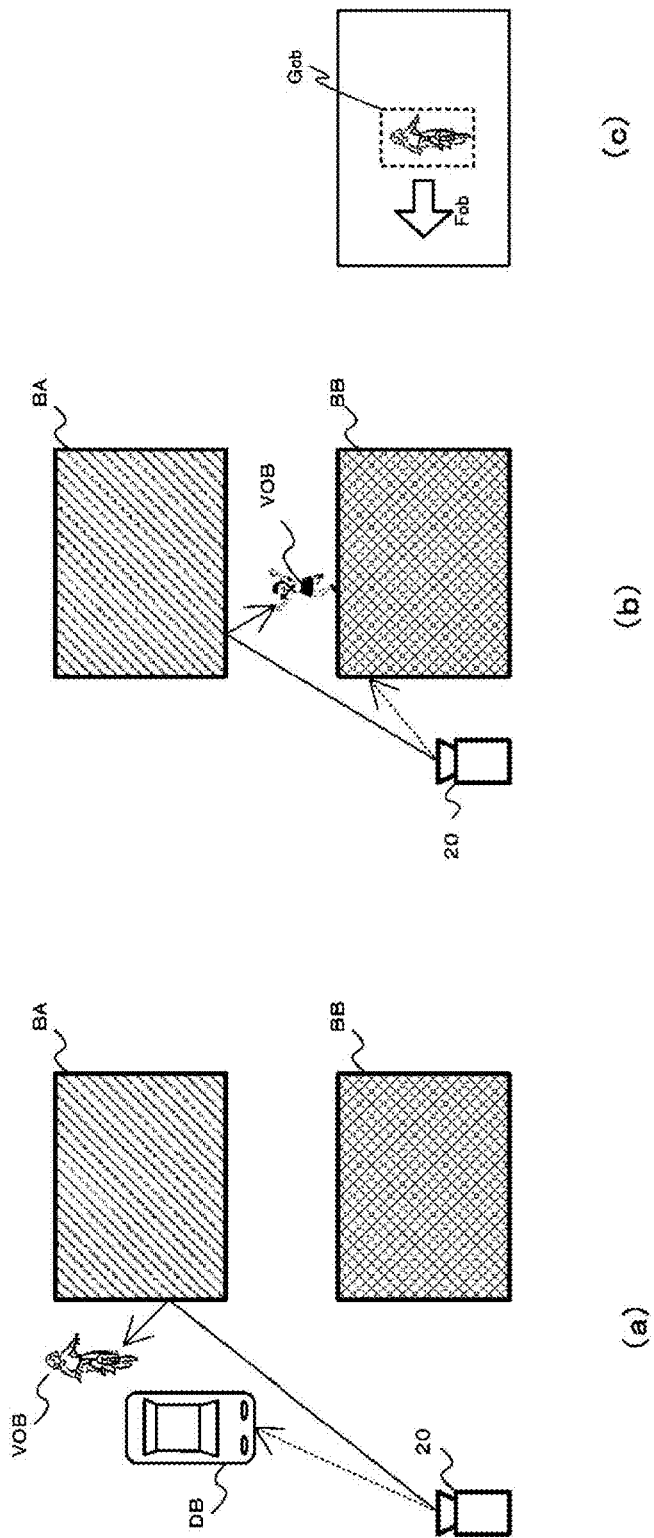
FIG. 9 is a diagram illustrating an operation example of the first embodiment.

FIG. 9 illustrates an operation example of the first embodiment. In FIG. 9, (a) illustrates a case in which the position of a viewed object VOB is at a position of a blind spot generated by an obstacle DB, and the viewed object VOB cannot be directly viewed from the polarized image acquisition unit 20. In a case where a wall surface of a structure BA is constituted by glass or the like and is a reflective surface, the viewed object VOB appears on the wall surface of the structure BA that can be viewed from the polarized image acquisition unit 20. Therefore, the information acquisition apparatus 10 can acquire the polarized images and extract the reflection components as described above to display the image of the viewed object VOB. Therefore, the viewed object VOB, such as a bicycle, which cannot be viewed due to the obstacle DB can be checked by the reflection component image.

In FIG. 9, (b) illustrates a case in which the position of the viewed object VOB is at a position of a blind spot generated by a structure BB, and the viewed object VOB cannot be directly viewed from the polarized image acquisition unit 20. In a case where the wall surface of the structure BA is constituted by glass or the like and is a reflective surface, the viewed object VOB appears on the wall surface of the structure BA that can be viewed from the polarized image acquisition unit 20. Therefore, the information acquisition apparatus 10 can acquire the polarized images and extract the reflection components as described above to display the image of the viewed object VOB. Therefore, the viewed object VOB, such as a person, which cannot be viewed due to the structure BB can be checked by the reflection component image.

Furthermore, by including the azimuth in the reflection information, the direction of the position of the viewed object VOB can also be easily determined. For example, (c) of FIG. 9 illustrates an image of the reflection components depicted in (a) of FIG. 9 and extracted by the information acquisition apparatus 10. Here, a normal direction of the wall surface with reflection of the viewed object VOB is a left direction, and an arrow Fob indicates that the viewed object VOB is positioned in the left direction.

According to such a first embodiment, the polarized images in a plurality of polarization directions can be used to utilize the extracted reflection components, and the information of the viewed object positioned in the blind spot can be checked.

2. Second Embodiment

Next, in a case described in a second embodiment, not only can the viewed object positioned in the blind spot be easily checked, but also the position of the viewed object is estimated.

Figure 10:
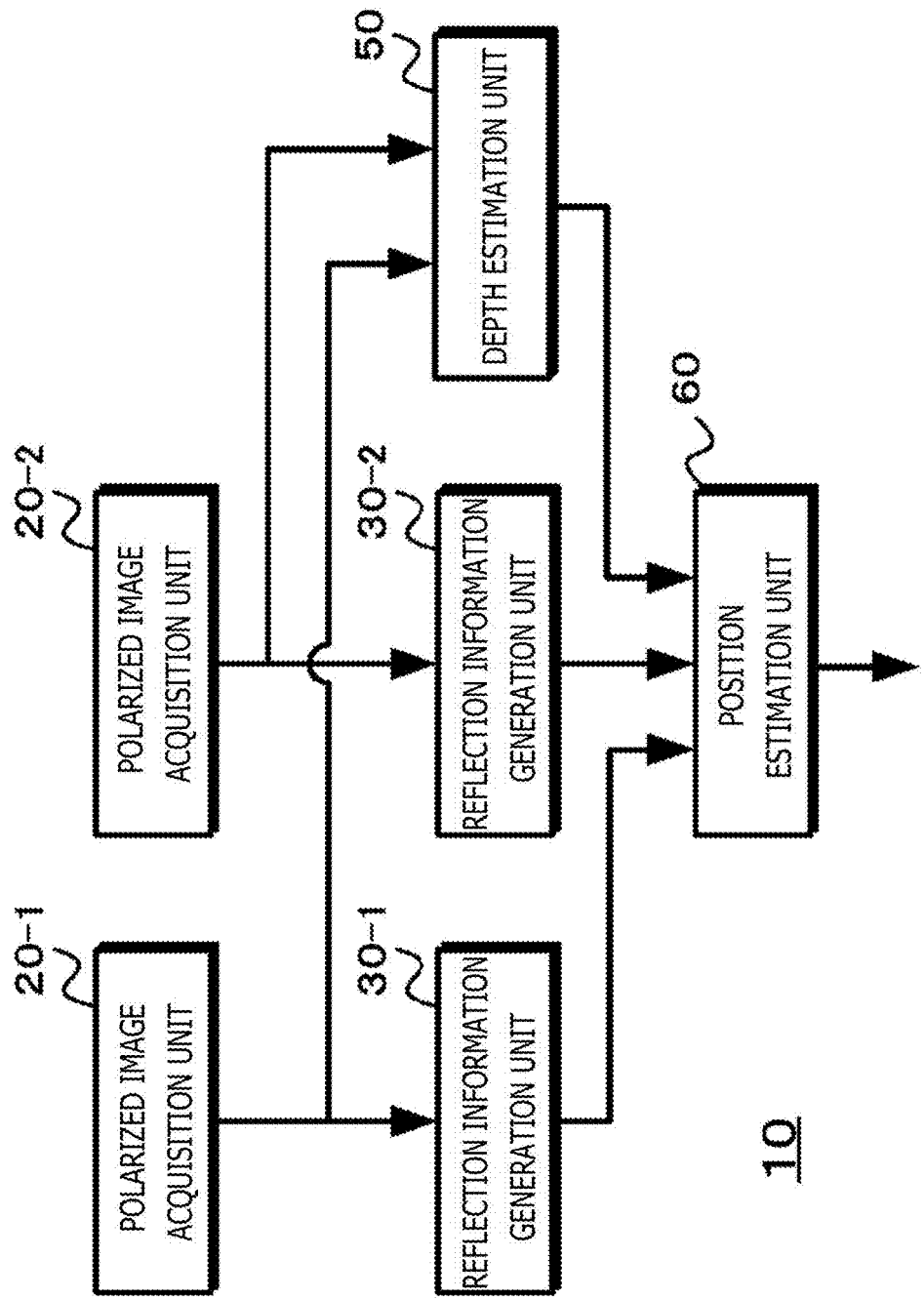
FIG. 10 is a diagram illustrating a configuration of a second embodiment.

FIG. 10 illustrates a configuration of the second embodiment. The information acquisition apparatus 10 includes polarized image acquisition units 20-1 and 20-2, reflection information generation units 30-1 and 30-2, a depth estimation unit 50, and a position estimation unit 60.

The polarized image acquisition units 20-1 and 20-2 are configured in the similar way as the polarized image acquisition unit 20 of the first embodiment, and the polarized image acquisition units 20-1 and 20-2 use the polarizing plates or the polarizing filters to acquire polarized images in three or more polarization directions. Furthermore, the polarized image acquisition unit 20-1 and the polarized image acquisition unit 20-2 constitute a stereo camera, and the polarized image acquisition unit 20-1 outputs the acquired polarized images from the left viewpoint to the reflection information generation unit 30-1 and the depth estimation unit 50. Furthermore, the polarized image acquisition unit 20-2 outputs the acquired polarized images from the right viewpoint to the reflection information generation unit 30-2 and the depth estimation unit 50.

The reflection information generation units 30-1 and 30-2 are configured in the similar way as the reflection information generation unit 30 of the first embodiment. The reflection information generation units 30-1 and 30-2 calculate the model equation indicated in Formula (1) for each pixel of the polarized images in three or more polarization directions. The reflection information generation units 30-1 and 30-2 also extract reflective surface areas that are concentrated areas where pixels are concentrated, in which in the pixels, the degree of polarization ρ indicated in Formula (2) is equal to or greater than a preset threshold. The reflection information generation units 30-1 and 30-2 further calculate the difference (Imax−Imin) between the maximum luminance Imax and the minimum luminance Imin for each pixel of the extracted reflective surface areas and sets the difference as a reflection component. The reflection information generation sections 30-1 and 30-2 generate reflection information, such as reflection information indicating the reflective surface areas, the reflection components, and the azimuths, from the polarized images in three or more polarization directions and output the reflection information to the position estimation unit 60.

The depth estimation unit 50 uses the polarized images acquired by the polarized image acquisition units 20-1 and 20-2 to execute a matching process and calculates the distance to the reflective surface area. In the matching process, for example, non-polarized images generated from the polarized images may be used, or the polarized images may be used. Furthermore, the reflection component images generated by the reflection information generation units 30-1 and 30-2 may be used. For example, in the case of (a) of FIG. 2, the non-polarized images can be acquired by averaging the luminance of four adjacent pixels in different polarization directions. In addition, in the case of (b) of FIG. 2, the luminance of the luminance polarization images with polarization directions different in each pixel can be averaged to acquire the non-polarized images. Furthermore, in the case of (c) of FIG. 2, if the distance between the lenses LZ is shorter than the distance to the viewed object so that the distance can be ignored, the parallax can be ignored in the plurality of polarized images in different polarization directions. Therefore, the luminance of the polarized images in different polarization directions can be averaged to acquire the non-polarized images. In addition, if a surrounding object appears in the reflective surface area, the distance to the reflective surface area may not be accurately calculated due to the influence of the image of the object appearing in the reflective surface area in calculating the distance to the reflective surface area in the matching process. Therefore, the depth estimation unit 50 may remove the reflection components calculated by the reflection information generation units 30-1 and 30-2 and use the images to execute the matching process. Furthermore, if the reflective surface area is a window glass or the like, the distance to the inside of the room may be calculated when the reflection components are removed. Therefore, the distance calculated for an area other than the reflective surface area determined on the basis of the degree of polarization ρ, the distance calculated for a boundary between the reflective surface area and another area, or the like may be used to execute an interpolation process or the like to calculate the distance to the reflective surface area in each image.

The depth estimation unit 50 may use any method, such as area-based matching, feature-based matching, and template matching, for the matching process. The depth estimation unit 50 executes the matching process to generate depth information indicating the distance to the object in each pixel of the reflective surface area on the basis of the amount of deviation of corresponding pixel positions.

Figure 11:
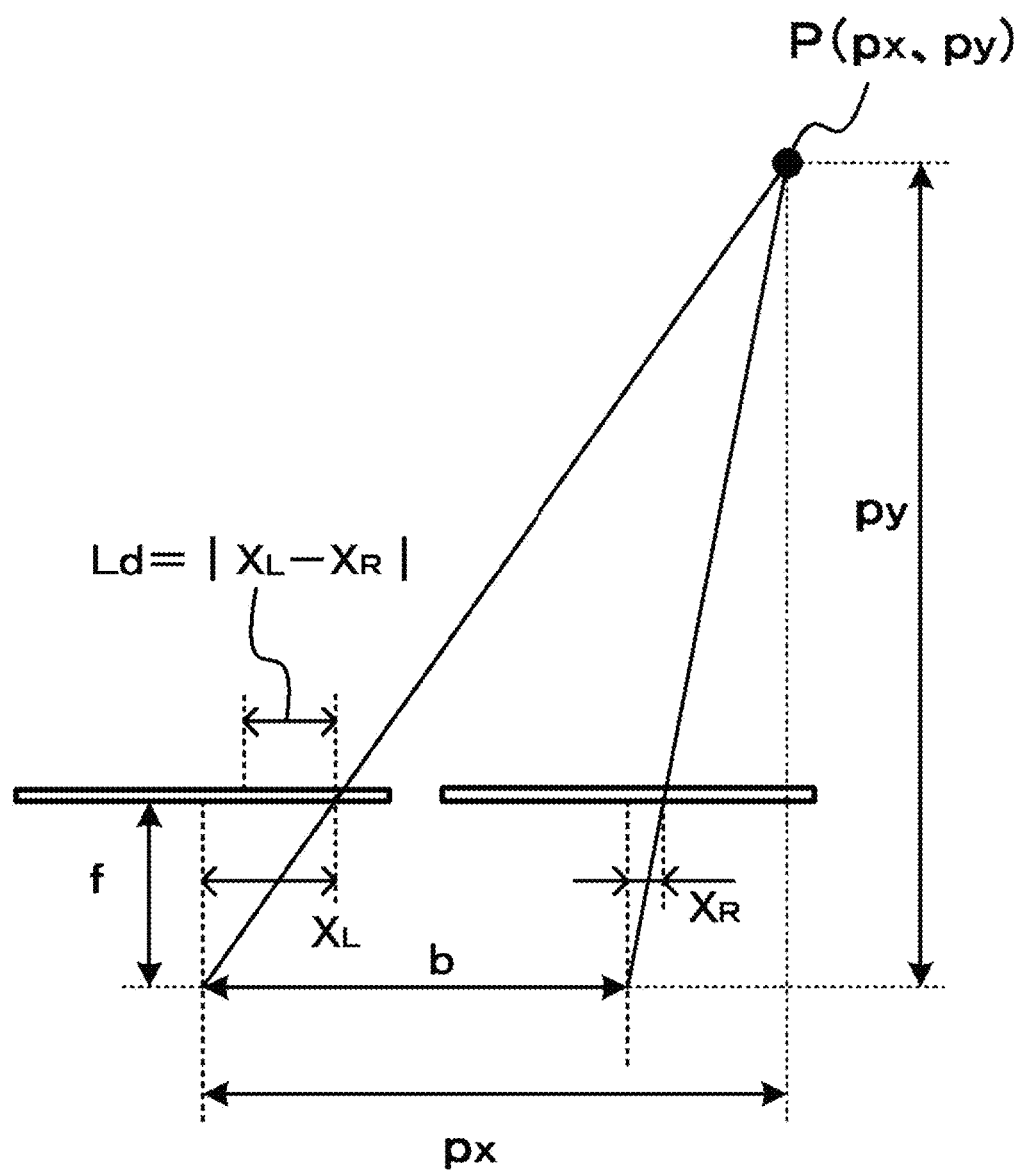
FIG. 11 is a diagram for describing calculation of a distance to the object.

FIG. 11 is a diagram for describing the calculation of the distance to the object. Note that FIG. 11 illustrates a case in which the polarized image acquisition units 20-1 and 20-2 are arranged on the left and the right in the same posture. Here, the polarized image acquisition unit 20-1 on the left side serves as a standard unit, and the polarized image acquisition unit 20-2 on the right side serves as a reference unit. Furthermore, an interval (base length) between standard positions of the polarized image acquisition units 20-1 and 20-2 will be defined as "b," and a focal length of the polarized image acquisition units 20-1 and 20-2 will be defined as "f." In this case, when an object position XR in the reference unit is deviated by "Ld" from an object position XL in the standard unit, a distance "Py" to a position P of the object can be calculated on the basis of Formula (3). Furthermore, since a slope of a straight line connecting the standard position of the polarized image acquisition unit 20-1 and the position P is "XL/f," a distance "Px" from the polarized image acquisition unit 20-1 is "Px=(XL/f)Py" where the position P is in the direction orthogonal to the arrangement direction of the polarized image acquisition units 20-1 and 20-2.

[Math. 3]

$$p_y = \frac{b \times f}{Ld} \quad (3)$$

Figure 12:
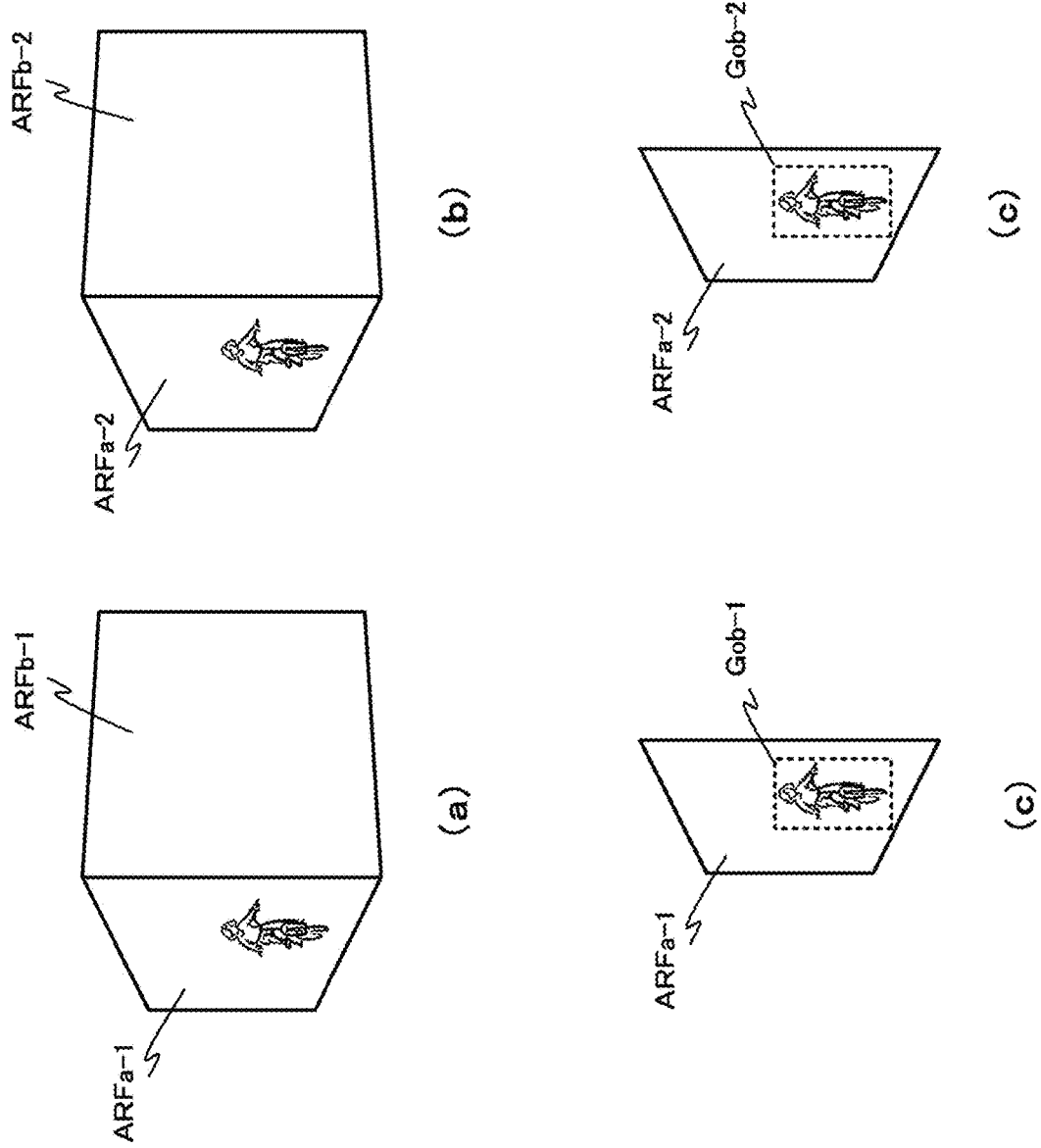
FIG. 12 is a diagram for describing a correspondence of areas.

The position estimation unit 60 uses the reflection information generated by the reflection information generation units 30-1 and 30-2 to associate the reflective surface areas. The position estimation unit 60 handles areas with similar average degree of polarization as corresponding areas, for example. Furthermore, the correspondence of the areas may be determined by, for example, executing the matching process using the non-polarized images generated from the polarized images or using the images obtained by removing the reflection components from the polarized images. FIG. 12 is a diagram for describing the correspondence of the areas. In FIG. 12, (a) illustrates reflective surface areas ARFa-1 and ARFb-1 based on the reflection information generated by the reflection information generation unit 30-1. Furthermore, in FIG. 12, (b) illustrates reflective surface areas ARFa-2 and ARFb-2 based on the reflection information generated by the reflection information generation unit 30-2. The position estimation unit 60 executes the process as described above to determine the corresponding areas of the reflective surface area ARFa-1 and the reflective surface area ARFa-2 and the corresponding areas of the reflective surface area ARFb-1 and the reflective surface area ARFb-2.

Next, the position estimation unit 60 associates the areas of the viewed object in the corresponding reflective surface areas. For example, the position estimation unit 60 performs the object recognition and handles the image areas with the same recognition result as the corresponding areas of the viewed object. Note that the correspondence of the viewed object may be determined on the basis of matching results of image feature quantity or the like. Furthermore, in a case where the viewed object is a luminous body, the corresponding areas may be determined on the basis of pixels with maximum luminance values. In FIG. 12, (c) illustrates the reflective surface area ARFa-1 based on the reflection information generated by the reflection information generation unit 30-1. Furthermore, in FIG. 12, (d) illustrates the reflective surface area ARFa-2 corresponding to the reflective surface area ARFa-1. The position estimation unit 60 executes the process as described above to determine an area Gob-1 of the viewed object in the reflective surface area ARFa-1 and an area Gob-2 of the viewed object in the reflective surface area ARFa-2 corresponding to the area Gob-1 of the viewed object.

Furthermore, the position estimation unit 60 further calculates the position of the viewed object on the basis of the depth information generated by the depth estimation unit 50, the position information of the corresponding reflective surface areas, and the position information of the corresponding viewed areas in the reflective surface area.

Figure 13:
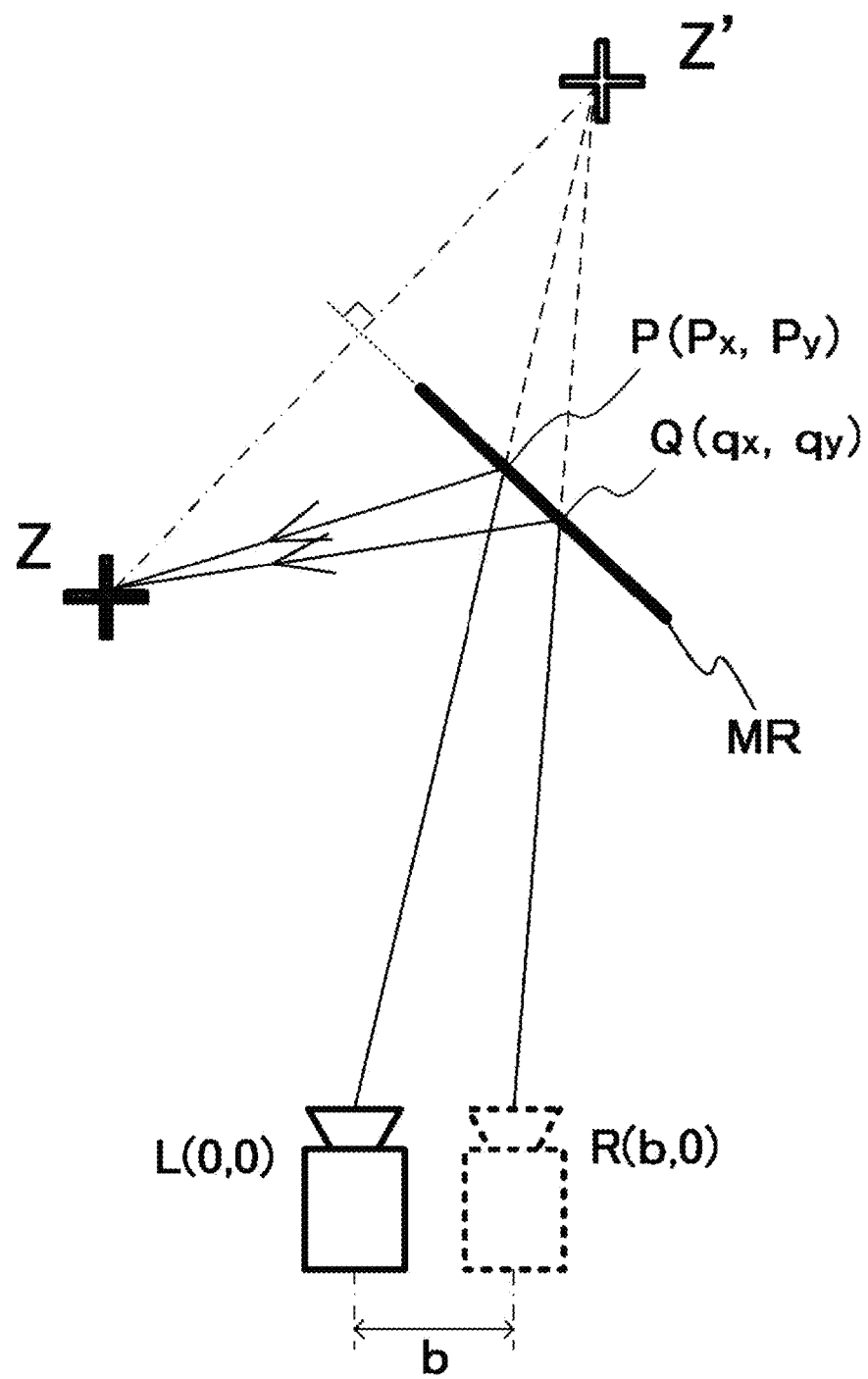
FIG. 13 is a diagram for describing calculation of a position of a viewed object.

FIG. 13 is a diagram for describing the calculation of the position of the viewed object. Note that in FIG. 13, the polarized image acquisition unit 20-1 of the left viewpoint is at the origin (0, 0) of the coordinate system. Furthermore, the viewed object is at a position Z, and a virtual image of the viewed object is at a position Z'.

Here, the position of the polarized image acquisition unit 20-1 will be defined as L (0, 0), and the position of the polarized image acquisition unit 20-2 will be defined as R (b, 0). Furthermore, the position of a reflective surface area MR on a straight line connecting the polarized image acquisition unit 20-1 and the position Z' of the virtual image will be defined as P (px, py), and the position of the reflective surface area MR on a straight line connecting the polarized image acquisition unit 20-2 and the position Z' of the virtual image will be defined as Q (qx, qy). In this case, the position P (px, py) and the position Q (qx, qy) become apparent by using the depth information or the like of the reflective surface area MR.

A formula indicating a straight line LP is Formula (4), and a formula indicating a straight line RQ is Formula (5). Furthermore, an intersection point of the straight line LP and the straight line RQ is at the position Z'. More specifically, the position Z' can be expressed by Formula (6).

[Math. 4]

$$y = \frac{p_y}{p_x} x \quad (4)$$

$$y = \frac{q_y}{q_x - b}(x - b) \quad (5)$$

$$Z' = (z'_x, z'_y) = \left( \frac{p_x q_y b}{p_x q_y - p_y(q_x - b)}, \frac{p_y q_y b}{p_x q_y - p_y(q_x - b)} \right) \quad (6)$$

Furthermore, the position Z of the viewed object to be calculated is a position satisfying Formula (7) and Formula (8). Here, when "m" is defined as depicted in Formula (9), the position Z of the viewed object can be calculated on the basis of Formula (10).

[Math. 5]

$$\frac{z_y - z'_y}{z_x - z'_x} \cdot \frac{p_y - q_y}{p_x - q_x} = -1 \quad (7)$$

$$\frac{z_y + z'_y}{2} - p_y = \frac{p_y - q_y}{p_x - q_x} \cdot \left( \frac{z_x + z'_x}{2} - p_x \right) \quad (8)$$

$$m = \frac{p_y - q_y}{p_x - q_x} \quad (9)$$

$$Z = (z_x, z_y) \quad (10)$$

$$= \left( \frac{(1-m^2)\,z'_x + 2m z'_y + 2m^2 p_x - 2m p_y}{1+m^2}, \frac{2m z'_x - (1-m^2)\,z'_y - 2m p_x + 2p_y}{1+m^2} \right)$$

Therefore, the values of the position P (px, py) and the position Q (qx, qy) obtained from the depth information of the reflective surface area can be assigned to Formula (6) to calculate the position Z of the viewed object.

Note that the calculation of the position Z of the viewed object is not limited to the method described above. For example, the position Z' of the virtual image of the viewed object appearing in the reflective surface areas from two different viewpoints may be calculated, and then the position Z' may be inverted about a line (reflective surface) connecting the position P (px, py) and the position Q (qx, qy) to calculate the position Z of the viewed object.

Figure 14:
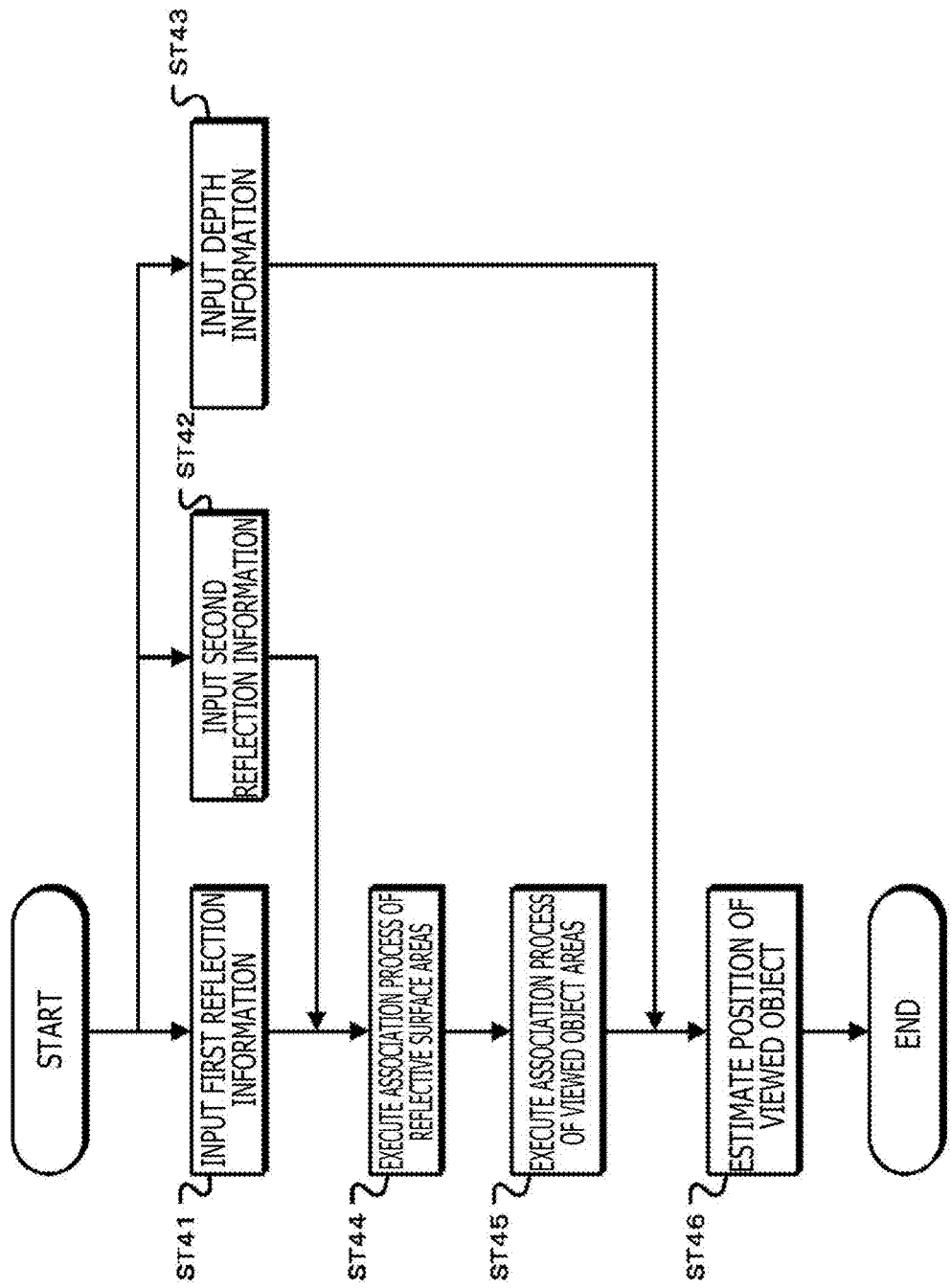
FIG. 14 is a flow chart depicting an estimation operation of the position of the viewed object.

In the operation of the second embodiment, the position of the viewed object is estimated in the process of step ST3 in the flow chart of FIG. 5. FIG. 14 is a flow chart depicting an estimation operation of the position of the viewed object.

In step ST41, the position estimation unit inputs first reflection information. The position estimation unit 60 inputs the reflection information output from the reflection information generation unit 30-1 as the first reflection information and proceeds to step ST44.

In step ST42, the position estimation unit inputs second reflection information. The position estimation unit 60 inputs the reflection information output from the reflection information generation unit 30-2 as the second reflection information and proceeds to step ST44.

In step ST43, the position estimation unit inputs depth information. The position estimation unit 60 inputs the depth information output from the depth estimation unit 50 and proceeds to step ST46.

In step ST44, the position estimation unit executes an association process of reflective surface areas. The position estimation unit 60 associates the reflective surface areas on the basis of the first and second reflection information and proceeds to step ST45.

In step ST45, the position estimation unit executes an association process of viewed object areas. The position estimation unit 60 uses the reflective surface areas determined to correspond in step ST44 to associate the areas of the same viewed object and proceeds to step ST46.

In step ST46, the position estimation unit estimates the position of the viewed object. The position estimation unit 60 uses the areas of the same viewed object included in the reflective surface areas and the depth information to perform the operation of Formula (10) and estimates the position of the viewed object.

According to the second embodiment, the position of the viewed object can be determined for the information of the viewed object positioned in the blind spot or the like.

Furthermore, since the position of the viewed object positioned in the blind spot or the like can be determined, the information acquisition apparatus 10 can be provided in a vehicle or the like to enable safer driving and the like.

3. Third Embodiment

Incidentally, although the position of the viewed object is estimated from the polarized images from a plurality of viewpoints in the case described in the second embodiment, reflection information of a plurality of reflective surface areas is used to estimate the position of the viewed object in a case described in a third embodiment.

Figure 15:
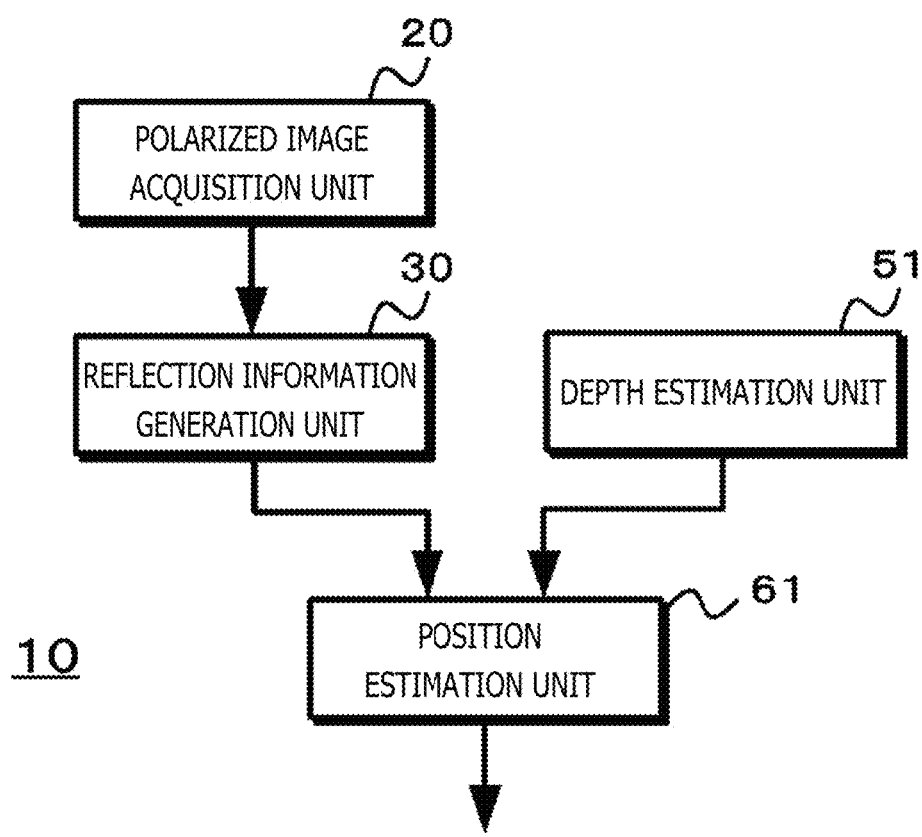
FIG. 15 is a diagram illustrating a configuration of a third embodiment.

FIG. 15 illustrates a configuration of the third embodiment. The information acquisition apparatus 10 includes the polarized image acquisition unit 20, the reflection information generation unit 30, a depth estimation unit 51, and a position estimation unit 61.

The polarized image acquisition unit 20 is configured in the similar way as in the first embodiment, and the polarized image acquisition unit 20 uses the polarizing plate or the polarizing filter to acquire polarized images in three or more polarization directions. The polarized image acquisition unit 20 outputs the acquired polarized images to the reflection information generation unit 30.

The reflection information generation unit 30 is configured in the similar way as in the first embodiment. The reflection information generation unit 30 calculates the model equation indicated in Formula (1) for each pixel of the polarized images in three or more polarization directions. The reflection information generation unit 30 also extracts a reflective surface area that is a concentrated area where pixels are concentrated, in which in the pixels, the degree of polarization ρ indicated in Formula (2) is equal to or greater than a preset threshold. The reflection information generation unit 30 further calculates the difference (Imax−Imin) between the maximum luminance Imax and the minimum luminance Imin for each pixel of the extracted reflective surface area and sets the difference as a reflection component. The reflection information generation section 30 generates reflection information, such as reflection information indicating the reflective surface area, the reflection component, and the azimuth, from the polarized images in three or more polarization directions and outputs the reflection information to the position estimation unit 61.

The depth estimation unit 51 is constituted by using an apparatus that can estimate the distance to the object. For example, the depth estimation unit 51 is constituted by using a TOF (Time Of Flight) camera, a stereo camera, structured light, or the like. In a case where the TOF camera is used, the depth estimation unit 51 estimates the distance on the basis of the time of return of projected light or the like. Furthermore, in a case where the stereo camera is used, the depth estimation unit 51 uses the parallax to estimate the distance. Furthermore, in a case where the structured light is used, the depth estimation unit 51 analyzes deformation of a projection pattern to estimate the distance. The depth estimation unit 51 outputs depth information indicating the estimation result of the distance to the position estimation unit 61.

The position estimation unit 61 calculates the position of the viewed object on the basis of the reflection information generated by the reflection information generation unit 30 and the depth information generated by the depth estimation unit 51.

Figure 16:
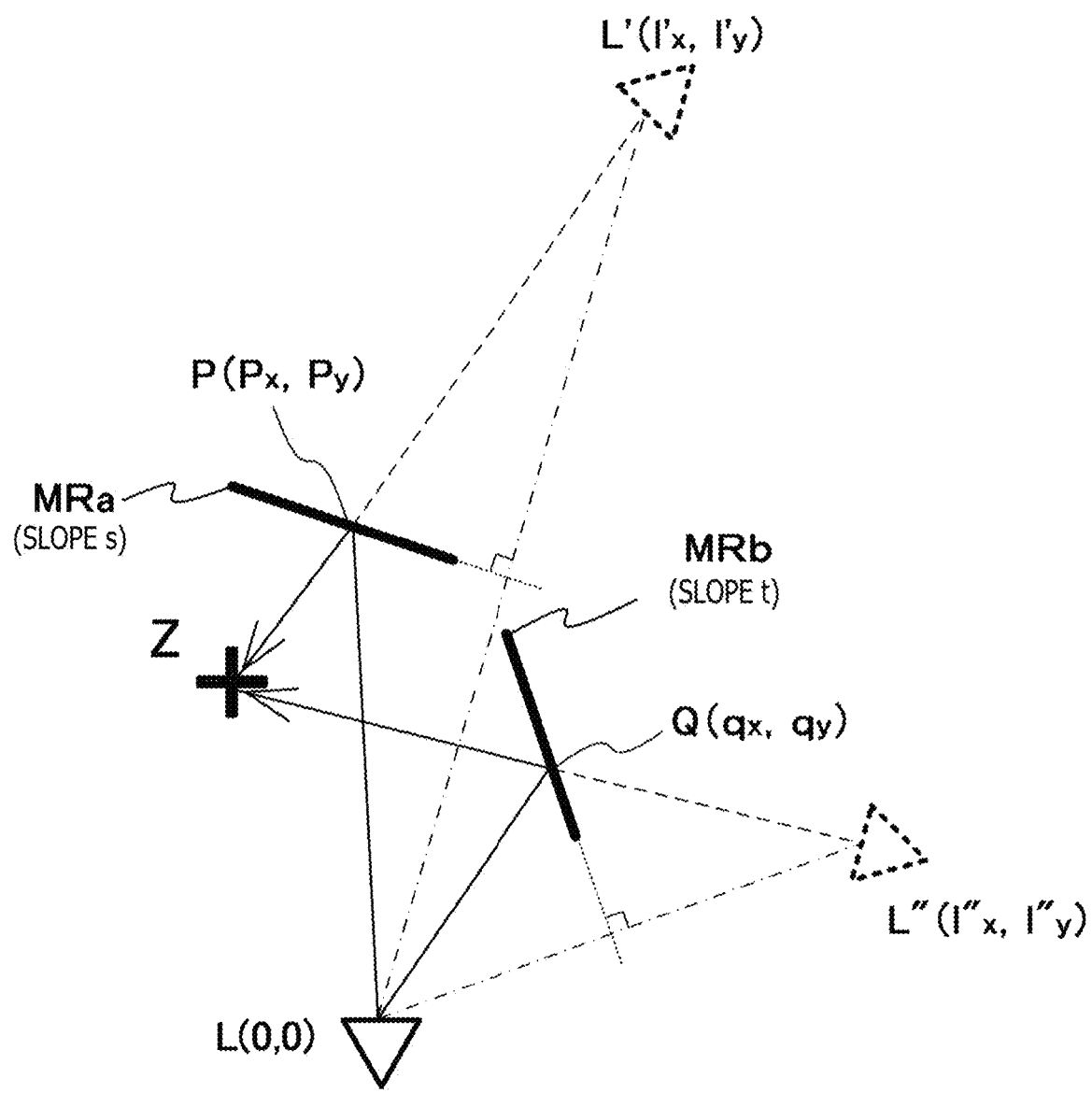
FIG. 16 is a diagram for describing calculation of the position of the viewed object.

FIG. 16 is a diagram for describing the calculation of the position of the viewed object. Note that in FIG. 16, the polarized image acquisition unit 20 is at the origin (0, 0) of the coordinate system. Since the depth information of the reflective surface areas is obtained, the position P (px, py) of a reflective surface area MRa and the position Q (qx, qy) of a reflective surface area MRb of the viewed object are apparent as in the second embodiment. Furthermore, a slope s of the reflective surface area MRa and a slope t of the reflective surface area MRb are also apparent from the depth information of the reflective surface areas.

Here, a symmetrical position of the position L (0, 0) of the polarized image acquisition unit 20 with respect to the reflective surface area MRa will be defined as L' (l'x, l'y), and a symmetrical position with respect to the reflective surface area MRb will be defined as L" (l"x, l"y). The position of the viewed object is at an intersection point of a straight line connecting the position L' and the position P and a straight line connecting the position L" and the position Q.

Here, the reflective surface area MRa with the slope s and the straight line connecting the position L' (l'x, l'y) and the position P are orthogonal to each other, and Formula (11) is established. Furthermore, the position P (px, py) is at an equal distance from the position L (0, 0) and the position L' (l'x, l'y), and Formula (12) is established. Therefore, the position L' (l'x, l'y) can be calculated on the basis of Formula (13). Similarly, the position L" (l"x, l"y) can be calculated on the basis of Formula (14).

[Math. 6]

$$s \cdot \frac{l'_y}{l'_x} = -1 \quad (11)$$

$$\frac{l'_y}{2} - p_y = s \cdot \left(\frac{l'_x}{2} - p_x\right) \quad (12)$$

$$L' = (l'_x, l'_y) = \left(\frac{2s^2 p_x - 2s p_y}{1 + s^2}, \frac{-2s p_x + 2 p_y}{1 + s^2}\right) \quad (13)$$

$$L'' = (l''_x, l''_y) = \left(\frac{2t^2 q_x - 2t q_y}{1 + t^2}, \frac{-2t q_x + 2 q_y}{1 + t^2}\right) \quad (14)$$

A formula indicating a straight line L'P is Formula (15), and a formula indicating a straight line L"Q is Formula (16). Therefore, Formula (17) allows to estimate the position Z (zx, zy) of the viewed object that is an intersection point of the straight light connecting the position L' and the position P and the straight line connecting the position L" and the position Q.

[Math. 7]

$$y - p_y = \frac{p_y - l'_y}{p_x - l'_x}(x - p_x) \quad (15)$$

$$y - q_y = \frac{q_y - l''_y}{q_x - l''_x}(x - q_x) \quad (16)$$

$$Z = (z_x, z_y) \quad (17)$$

$$= \left(\frac{(p_x - l'_x)(q_x l''_y - q_y l''_x) - (p_y - l'_y)(q_x l''_y - q_y l''_x) -}{(q_x - l''_x)(p_x l'_y - p_y l'_x)}, \frac{(q_y - l''_y)(p_x l'_y - p_y l'_x)}{(p_y - l'_y)(q_x - l''_x) -}\right)$$
$$\phantom{=}\left(\frac{(p_y - l'_y)(q_x - l''_x) -}{(p_x - l'_x)(q_y - l''_y)}, \frac{(p_y - l'_y)(q_x - l''_x) -}{(p_x - l'_x)(q_y - l''_y)}\right)$$

Figure 17:
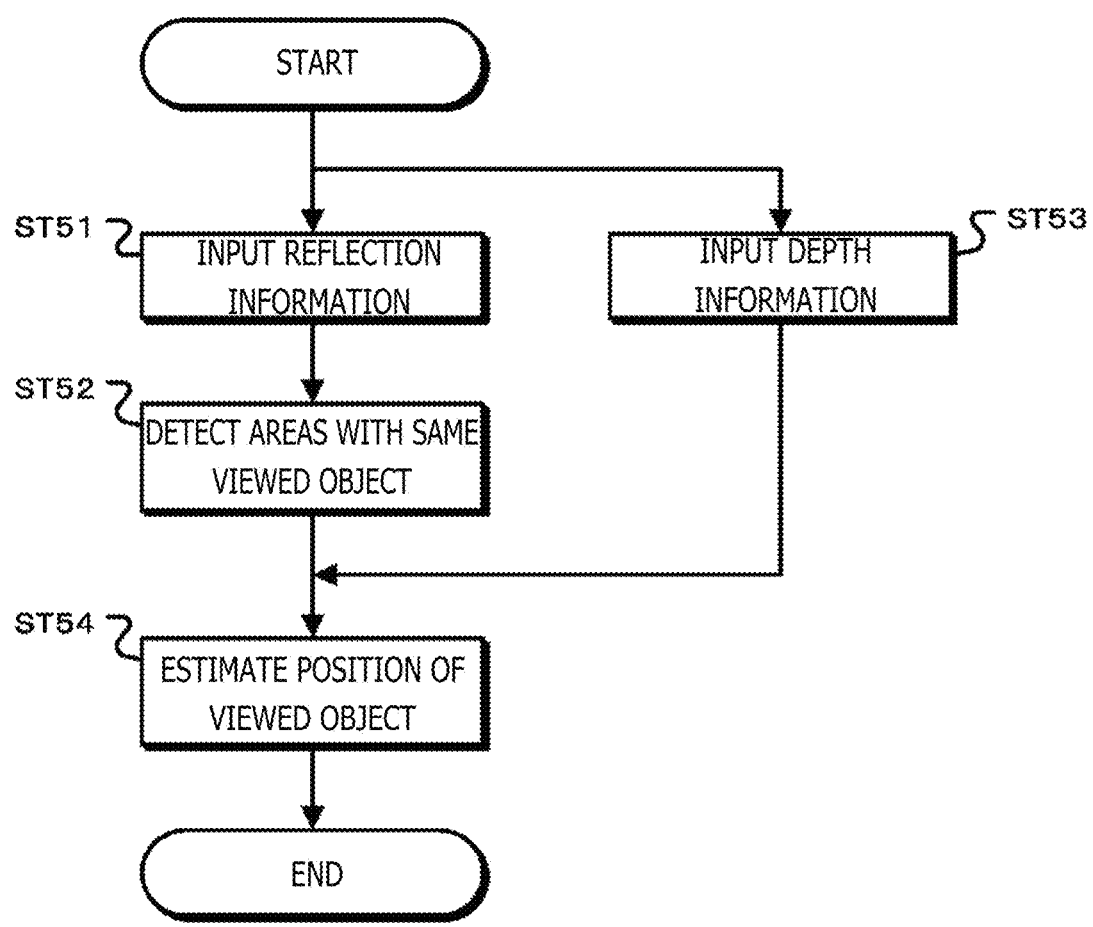
FIG. 17 is a flow chart depicting an estimation operation of the position of the viewed object.

In the operation of the third embodiment, the position of the viewed object is estimated in the process of step ST3 in the flow chart of FIG. 5. FIG. 17 is a flow chart depicting an estimation operation of the position of the viewed object.

In step ST51, the position estimation unit inputs reflection information. The position estimation unit 61 inputs the reflection information output from the reflection information generation unit 30 and proceeds to step ST52.

In step ST52, the position estimation unit detects areas of the same viewed object. On the basis of the reflection information input in step ST51, the position estimation unit 61 determines the reflective surface areas with reflection of the same viewed object from a plurality of reflective surface areas in the polarized images acquired by the polarized image acquisition unit 20. Furthermore, the position estimation unit 61 further detects the areas of the same viewed object from the reflection component images of the determined reflective surface areas and proceeds to step ST54.

In step ST53, the position estimation unit inputs depth information. The position estimation unit 61 inputs the depth information generated by the depth estimation unit 51 and proceeds to step ST54.

In step ST54, the position estimation unit estimates the position of the viewed object. On the basis of the depth information, the position estimation unit 61 uses the positions of the plurality of reflective surface areas with reflection of the same viewed object and the positions of the viewed object on the reflective surface areas appearing in the reflective surface areas to perform the operation of Formula (17) to estimate the position of the viewed object.

Figure 18:
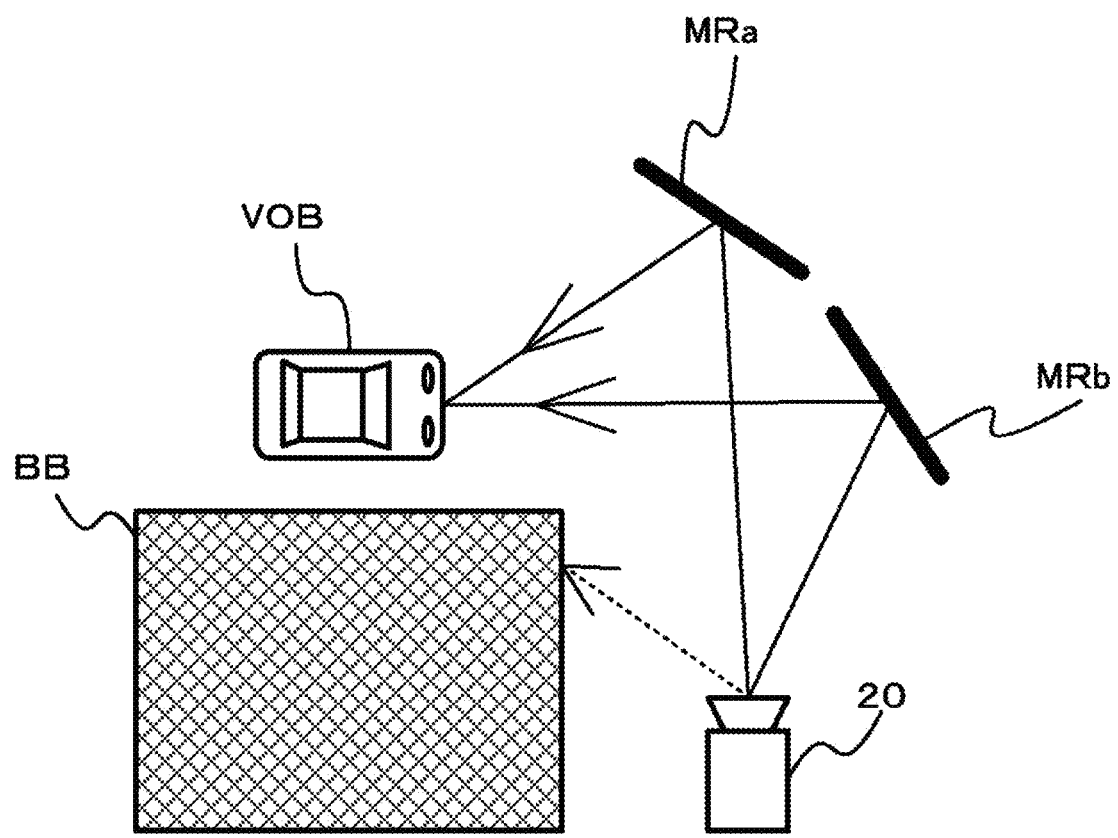
FIG. 18 is a diagram depicting an operation example of a third embodiment.

FIG. 18 illustrates an operation example of the third embodiment. The position of the viewed object VOB is a position of the blind spot generated by the structure BB, and the viewed object VOB cannot be directly viewed from the polarized image acquisition unit 20 in the illustrated case. Here, in a case where side surfaces of an automobile or the like positioned in front are reflective surfaces, the viewed object VOB appears in the side surfaces (reflective surface areas) MRa and MRb of the automobile or the like that can be viewed from the polarized image acquisition unit 20. Therefore, the information acquisition apparatus 10 can acquire the polarized images as described above to perform the position estimation of the viewed object to estimate the position of the viewed object VOB.

According to the third embodiment, the reflection information of a plurality of reflective surface areas with reflection of the viewed object can be used to determine the position of the viewed object positioned in the blind spot or the like. Furthermore, the position of the viewed object can be determined without using a plurality of polarized image acquisition units with different viewpoint positions as in the second embodiment. Furthermore, since the position of the viewed object positioned in the blind spot or the like can be determined, the information acquisition apparatus 10 can be provided in a vehicle or the like to enable safer driving and the like.

4. Fourth Embodiment

Incidentally, when the polarized image acquisition unit moves, the polarized images acquired by the polarized image acquisition unit are images from different viewpoints. More specifically, a plurality of polarized images from different viewpoint positions can be obtained with time without providing a plurality of polarized image acquisition units. Therefore, in a case described in a fourth embodiment, the polarized images from different viewpoint positions obtained by the movement of the polarized image acquisition unit are used to estimate the position of the viewed object.

Figure 19:
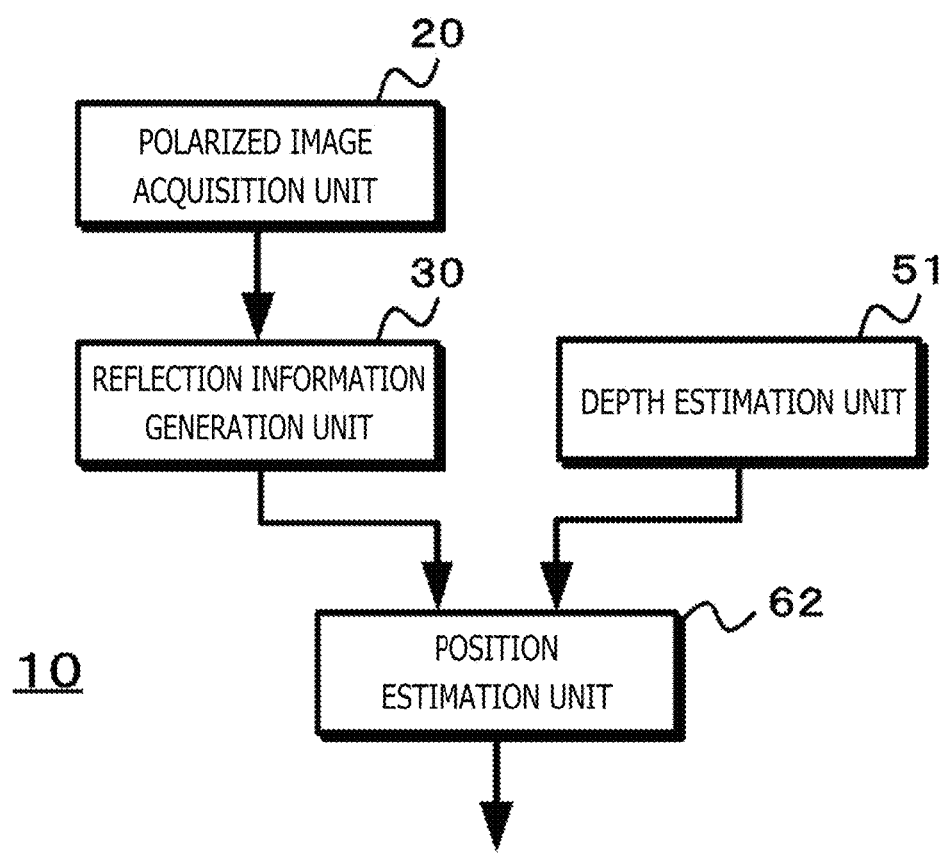
FIG. 19 is a diagram illustrating a configuration of a fourth embodiment.

FIG. 19 illustrates a configuration of the fourth embodiment. The information acquisition apparatus 10 includes the polarized image acquisition unit 20, the reflection information generation unit 30, the depth estimation unit 51, and a position estimation unit 62.

The polarized image acquisition unit 20 is configured in the similar way as in the first embodiment, and the polarized image acquisition unit 20 uses the polarizing plate or the polarizing filter to acquire polarized images in three or more polarization directions. The polarized image acquisition unit 20 outputs the acquired polarized images to the reflection information generation unit 30.

The reflection information generation unit 30 is configured in the similar way as in the first embodiment. The reflection information generation unit 30 calculates the model equation indicated in Formula (1) for each pixel of the polarized images in three or more polarization directions. Furthermore, the reflection information generation unit 30 also extracts a reflective surface area that is a concentrated area where pixels are concentrated, in which in the pixels, the degree of polarization ρ indicated in Formula (2) is equal to or greater than a preset threshold. Moreover, the reflection information generation unit 30 further calculates the difference (Imax−Imin) between the maximum luminance Imax and the minimum luminance Imin for each pixel of the extracted reflective surface area and sets the difference as a reflection component. The reflection information generation section 30 generates reflection information, such as reflection information indicating the reflective surface area, the reflection component, and the azimuth, from the polarized images in three or more polarization directions and outputs the reflection information to the position estimation unit 61.

The depth estimation unit 51 is constituted by using an apparatus that can estimate the distance to the object as in the third embodiment, and the depth estimation unit 51 estimates the distance and outputs the depth information indicating the estimation result to the position estimation unit 62.

The position estimation unit 62 calculates the position of the viewed object from the reflection information generated by the reflection information generation unit 30 at time intervals and the depth information generated by the depth estimation unit 51.

Figure 20:
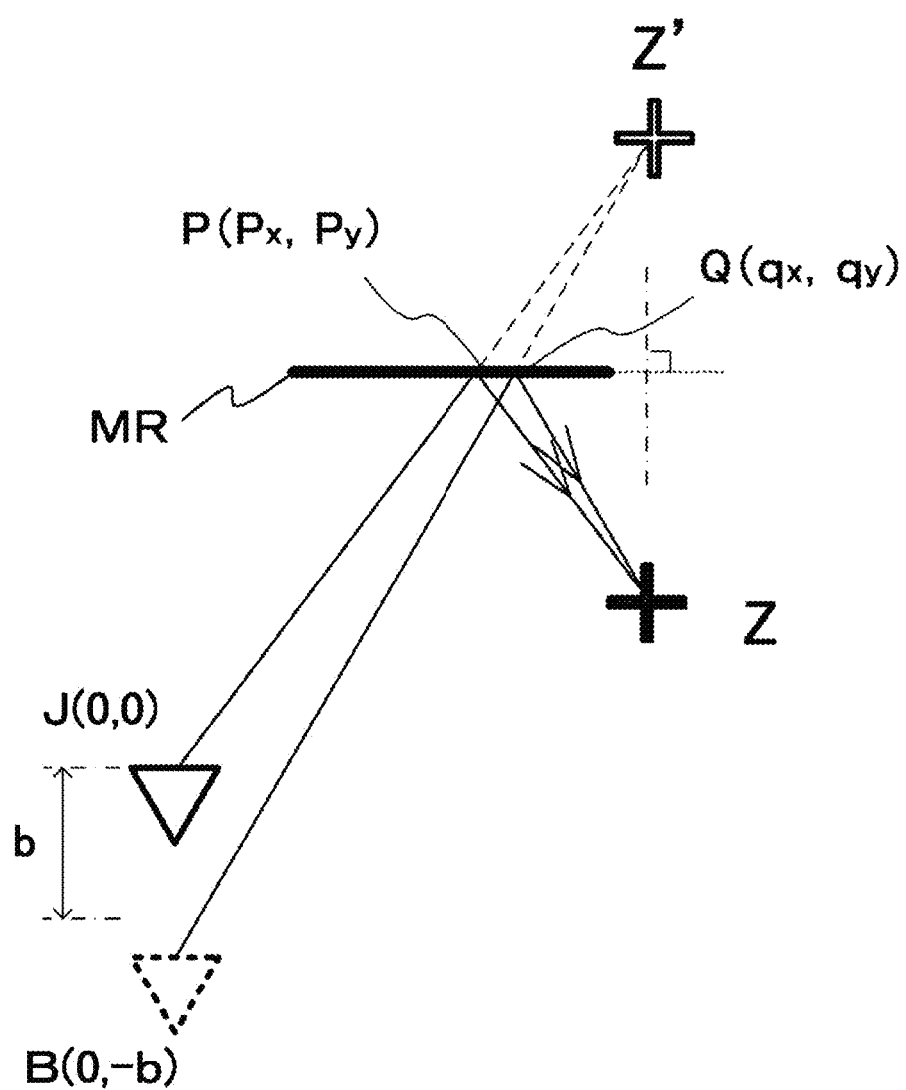
FIG. 20 is a diagram for describing calculation of the position of the viewed object.

FIG. 20 is a diagram for describing the calculation of the position of the viewed object. Note that in FIG. 20, the position of the polarized image acquisition unit 20 at a point in time T+1 is set as the origin (0, 0) of the coordinate system and defined as a position J (0, 0). Furthermore, the position of the polarized image acquisition unit 20 at a point in time T is defined as B (0, −b). Note that the polarized image acquired at the point in time T can be handled as a polarized image from a first viewpoint, and the polarized image acquired at the point in time T+1 can be handled as a polarized image from a second viewpoint. In this way, the depth information can be generated in the similar way as in the second embodiment.

The depth information of the reflective surface area can be used to recognize the image position P (px, py) of the viewed object in the reflective surface area MR at the point in time T and the image position Q (qx, qy) of the viewed object in the reflective surface area MR at the point in time T+1. Note that a distance b of movement from the point in time T to the point in time T+1 may be calculated from information of a distance meter or from the positions of the polarized image acquisition unit 20 at the points in time T and T+1 detected by a positioning system or the like.

In this case, a formula indicating a straight line JP is Formula (18), and a formula indicating a straight line BQ is Formula (19). Furthermore, the intersection point of the straight line JP and the straight line BQ is at the position Z' of the virtual image. More specifically, the position Z' can be expressed by Formula (20).

[Math. 8]

$$y = \frac{p_y}{p_x}x \tag{18}$$

$$y + b = \frac{q_y + b}{q_x}x \tag{19}$$

$$Z' = (z'_x, z'_y) = \left(\frac{-p_x q_x b}{p_y q_x - p_x(q_x + b)}, \frac{-p_y q_x b}{p_y q_x - p_x(q_x + b)}\right) \tag{20}$$

Furthermore, the position Z of the viewed object to be calculated is a position satisfying Formula (21) and Formula (22). Here, when "m" is defined as indicated in Formula (23), the position Z of the viewed object can be calculated on the basis of Formula (24).

[Math. 9]

$$y = \frac{p_y}{p_x}x \tag{18}$$

$$y + b = \frac{q_y + b}{q_x}x \tag{19}$$

$$Z' = (z'_x, z'_y) = \left(\frac{-p_x q_x b}{p_y q_x - p_x(q_x + b)}, \frac{-p_y q_x b}{p_y q_x - p_x(q_x + b)}\right) \tag{20}$$

Therefore, the values of the position P (px, py) and the position Q (qx, qy) obtained from the depth information of the estimated reflective surface area MR can be used to perform an operation of Formula (20) and Formula (24) to calculate the position Z of the viewed object.

Figure 21:
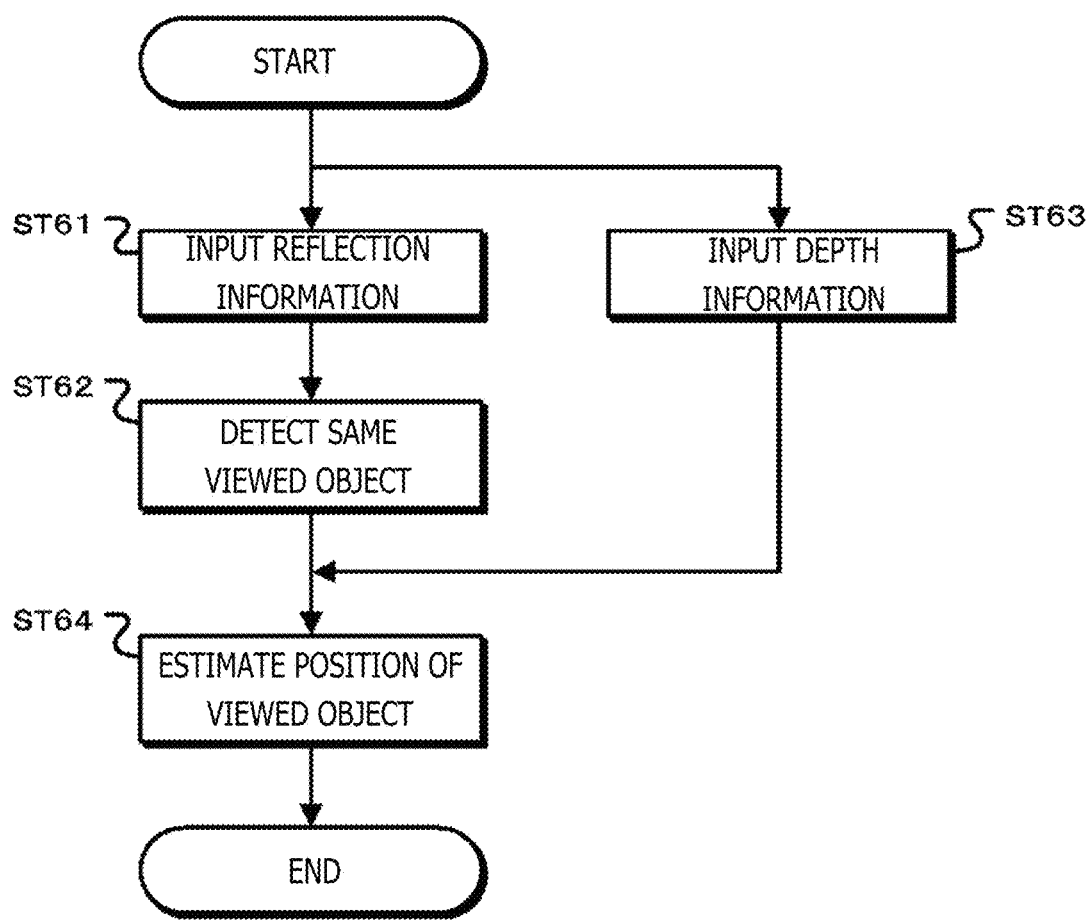
FIG. 21 is a flow chart depicting an estimation operation of the position of the viewed object.

In the operation of the fourth embodiment, the position of the viewed object is estimated in the process of step ST3 in the flow chart of FIG. 5. FIG. 21 is a flow chart depicting an estimation operation of the position of the viewed object.

In step ST61, the position estimation unit inputs reflection information. The position estimation unit 62 inputs the reflection information output from reflection information generation unit 30 and proceeds to step ST62.

In step ST62, the position estimation unit detects the same viewed object. The position estimation unit 62 determines the reflective surface areas with reflection of the same viewed object from the plurality of reflective surface areas in the polarized images acquired by the polarized image acquisition unit 20 on the basis of the reflection information input in step ST61. Furthermore, the position estimation unit 62 further detects the areas of the same viewed object from the reflection component images of the determined reflective surface areas and proceeds to step ST64.

In step ST63, the position estimation unit inputs depth information. The position estimation unit 62 inputs the depth information generated by the depth estimation unit 51 and proceeds to step ST64.

In step ST64, the position estimation unit estimates the position of the viewed object. On the basis of the depth information, the position estimation unit 62 uses the positions of the reflective surface areas with reflection of the same viewed object at the point in time T and at the point in time T+1 and the positions of the viewed object on the reflective surface areas appearing in the reflective surface areas to perform the operation of Formula (24) and estimates the position of the viewed object.

Figure 22:
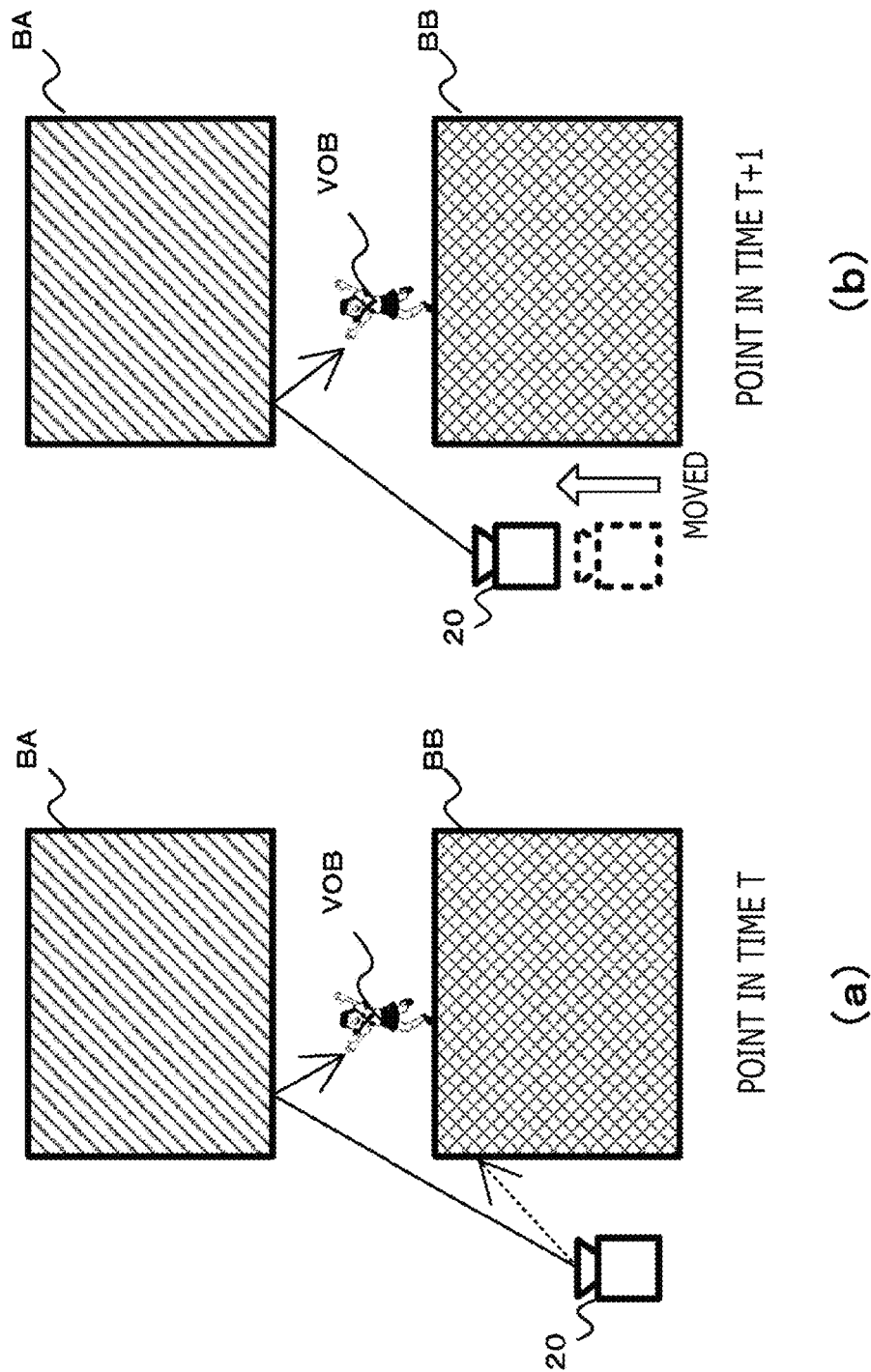
FIG. 22 is a diagram illustrating an operation example of a fourth embodiment.

FIG. 22 illustrates an operation example of the fourth embodiment. FIG. 22 illustrates a case in which the position of the viewed object VOB is at the position of the blind spot generated by the structure BB, and the viewed object VOB cannot be directly viewed from the polarized image acquisition unit 20. In a case where the wall surface of the structure BA is constituted by glass or the like and is a reflective surface, the viewed object VOB appears on the wall surface of the structure BA that can be viewed from the polarized image acquisition unit 20. Furthermore, in FIG. 22, (a) illustrates the position of the polarized image acquisition unit 20 at the point in time T, and (b) of FIG. 22 illustrates the position of the polarized image acquisition unit 20 at the point in time T+1 after the movement. In this case, the polarized images in a plurality of polarization directions from the viewpoint at the position of the point in time T and the polarized images in a plurality of polarization directions from viewpoint at the position of the point in time T+1 can be used to perform the position estimation as described above to estimate the position of the viewed object VOB.

According to the fourth embodiment, the reflection information of a plurality of reflective surface areas with reflection of the viewed object can be used to determine the position of the viewed object positioned in the blind spot or the like. Furthermore, the position of the viewed object positioned in the blind spot or the like can be determined without using a plurality of polarized image acquisition units with different viewpoint positions as in the second embodiment. Furthermore, the position of the viewed object can be determined even if the polarized images do not include a plurality of reflective surface areas with reflection of the same viewed object.

5. Other Embodiments

Figure 23:
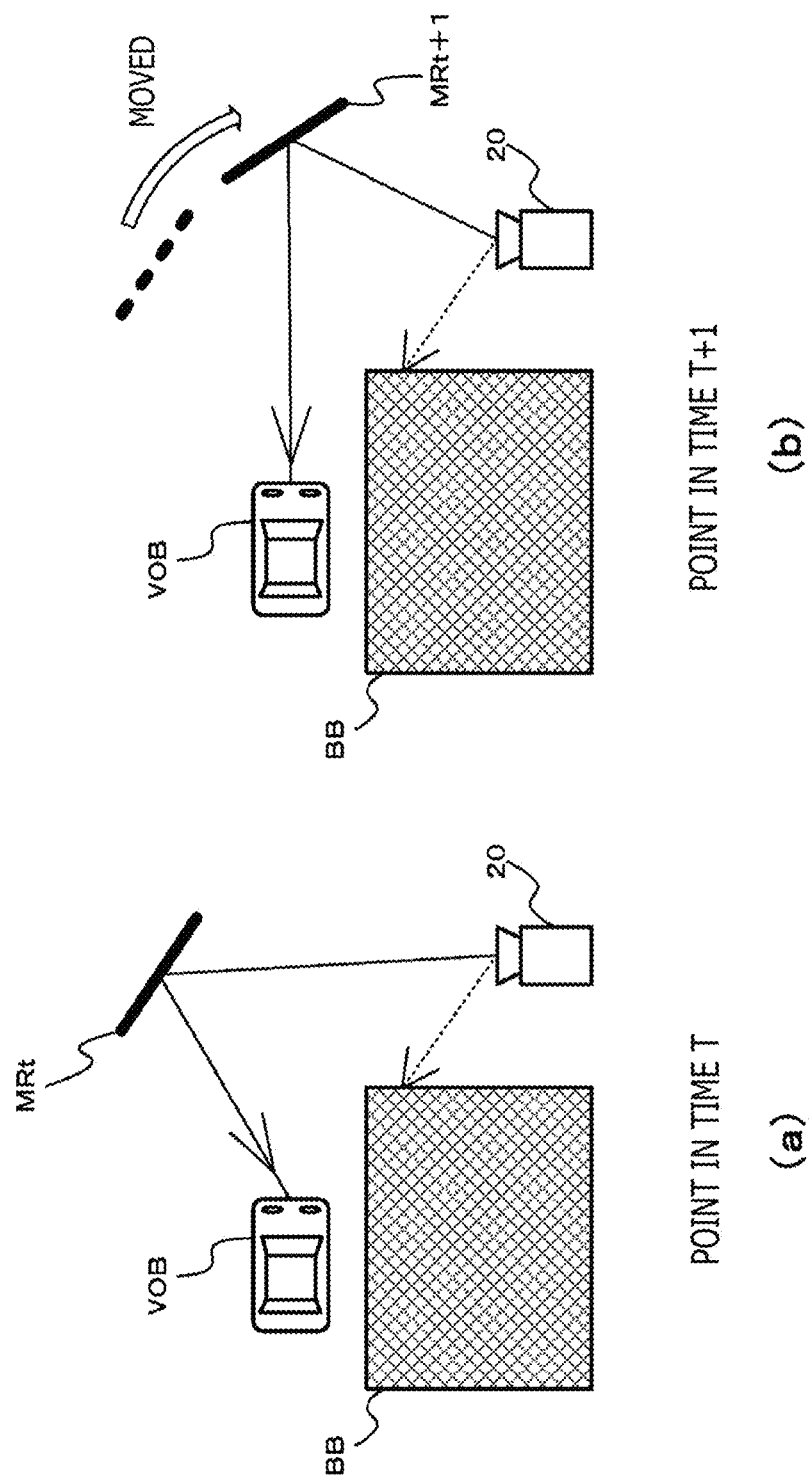
FIG. 23 is a diagram illustrating an operation example of another embodiment.

Incidentally, in the case described in the fourth embodiment, the polarized image acquisition unit 20 is moved to determine the position of the viewed object positioned in the blind spot. However, if the viewed object appears in a moving body including a reflective surface, the position of the viewed object may be determined from a polarized image obtained by imaging the reflective surface with the moving body at the position of the point in time T and a polarized image obtained by imaging the reflective surface with the moving body at the position of the point in time T+1 as depicted in FIG. 23.

In this case, a reflective surface area MRt of the polarized image at the point in time T and a reflective surface area MRt+1 of the polarized image at the point in time T+1 are equivalent to the plurality of reflective surface areas MRa and MRb in the polarized images picked up in the third embodiment. Therefore, the reflective surface area MRt at the point in time T and the reflective surface area MRt+1 at the point in time T+1 can be used to execute the process as in the third embodiment to estimate the position of the viewed object VOB.

6. Application Example of Information Acquisition Apparatus

Figure 24:
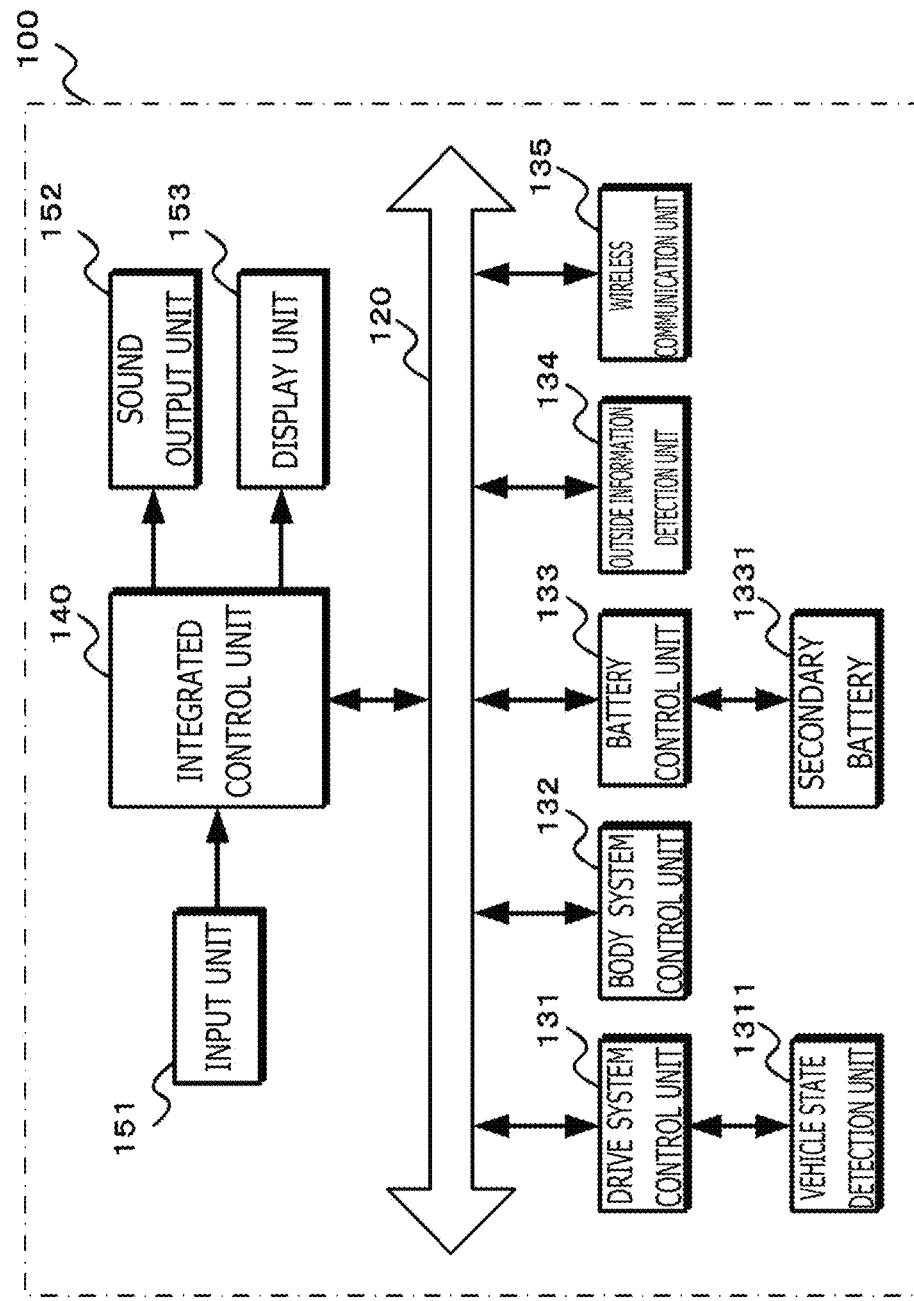
FIG. 24 is a block diagram illustrating a schematic configuration of a vehicle control system.

Next, an application example of the information acquisition apparatus will be described. FIG. 24 is a block diagram illustrating a schematic configuration of a vehicle control system using the information acquisition apparatus of the technique. A vehicle control system 100 includes a plurality of control units and detection units connected through a communication network 120. In the example illustrated in FIG. 24, the vehicle control system 100 includes a drive system control unit 131, a body system control unit 132, a battery control unit 133, an outside information detection unit 134, a wireless communication unit 135, and an integrated control unit 140. The communication network 120 may be an on-board communication network compliant with an arbitrary standard, such as a CAN (Controller Area Network), a LIN (Local Interconnect Network), a LAN (Local Area Network), and FlexRay (registered trademark). Furthermore, an input unit 151, a sound output unit 152, and a display unit 153 are connected to the integrated control unit 140.

Each control unit includes: a microcomputer that executes arithmetic processing according to various programs; a storage unit that stores programs executed by the microcomputer, parameters used for various operations, and the like; and a drive circuit that drives various apparatuses to be controlled.

The drive system control unit 131 controls operation of apparatuses related to a drive system of the vehicle according to various programs. For example, the drive system control unit 131 functions as a driving force generation apparatus, such as an internal combustion engine and a driving motor, that generates driving force of the vehicle, a driving force transmission mechanism that transmits the driving force to the wheels, and a steering mechanism that adjusts the steering angle of the vehicle. The drive system control unit 131 may also function as a control apparatus, such as a braking apparatus, that generates braking force of the vehicle or a control apparatus, such as an ABS (Antilock Brake System) and an ESC (Electronic Stability Control).

A vehicle state detection unit 1311 is connected to the drive system control unit 131. The vehicle state detection unit 1311 includes, for example, at least one of a gyro sensor that detects the angular velocity of the axial rotation motion of the vehicle body, an acceleration sensor that detects the acceleration of the vehicle, and sensors that detect the amount of operation of the accelerator pedal, the amount of operation of the brake pedal, the steering angle of the steering wheel, the engine speed, the driving speed, and the like. The drive system control unit 131 uses signals input from the vehicle state detection unit 1311 to execute arithmetic processing to control the internal combustion engine, the driving motor, the electric power steering apparatus, the brake apparatus, and the like.

The body system control unit 132 controls operation of various apparatuses installed on the vehicle body according to various programs. For example, the body system control unit 132 functions as a control apparatus of a keyless entry system, a smart key system, a power window apparatus, or various lamps, such as a headlamp, a back lamp, a brake lamp, a turn signal, and a fog lamp. In this case, radio waves sent from a mobile device substituting the key or signals of various switches can be input to the body system control unit 132. The body system control unit 132 receives the input of the radio waves or signals to control the door lock apparatus, the power window apparatus, the lamps, and the like of the vehicle.

The battery control unit 133 controls a secondary battery 1331 that is a power supply source of the driving motor according to various programs. For example, information, such as battery temperature, battery output voltage, and remaining capacity of the battery, is input from a battery apparatus including the secondary battery 1331 to the battery control unit 133. The battery control unit 133 uses the signals to execute arithmetic processing to control the temperature adjustment of the secondary battery 1331 or control a cooling apparatus or the like included in the battery apparatus.

The outside information detection unit 134 detects information of the outside of the vehicle provided with the vehicle control system 100. The information acquisition apparatus 10 of the technique is provided on the outside information detection unit 134.

Figure 25:
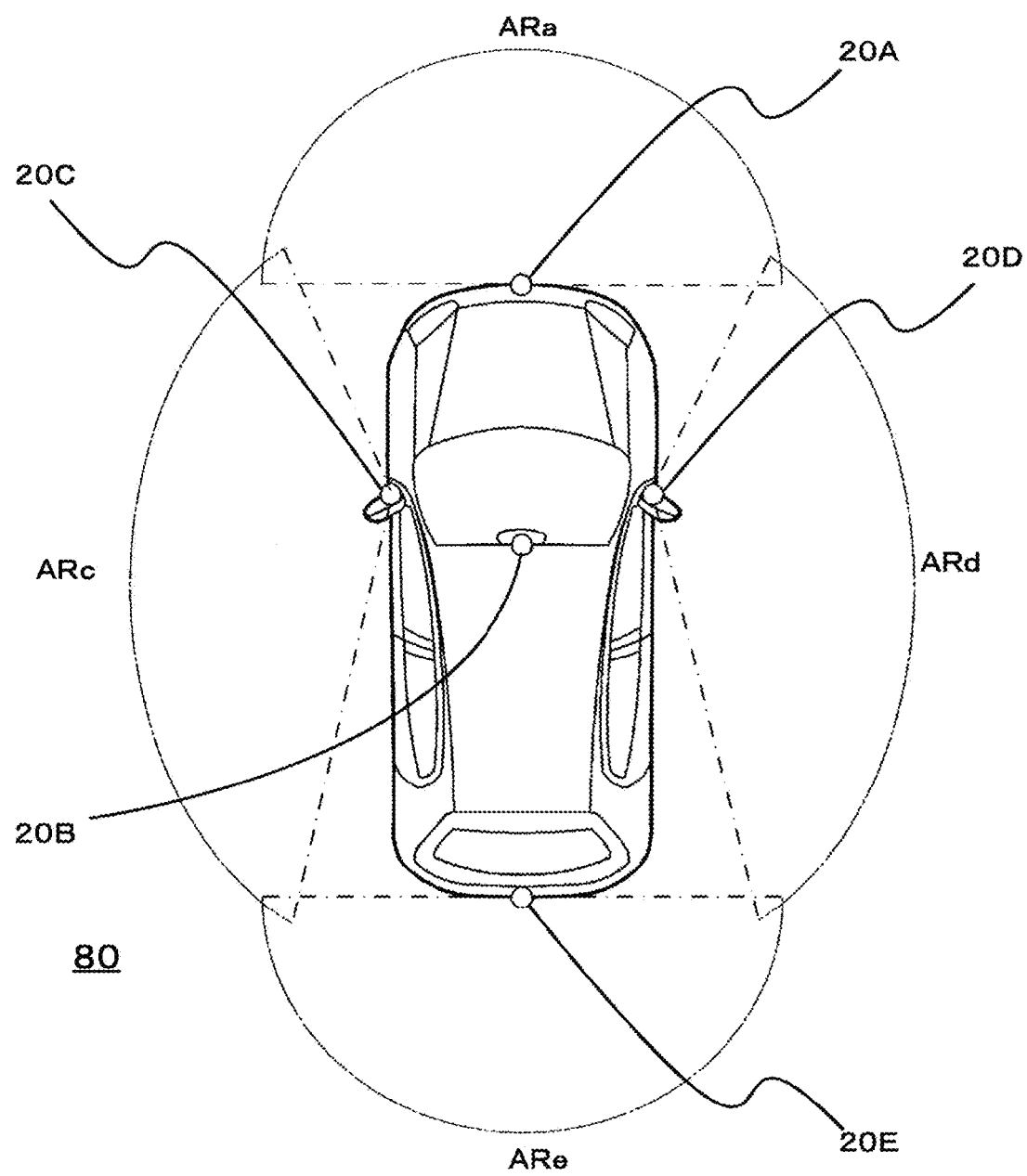
FIG. 25 is a diagram illustrating an example of installation of the polarized image acquisition unit.

FIG. 25 is a diagram illustrating an example of installation of the polarized image acquisition unit. The polarized image acquisition unit 20 is provided on, for example, at least one position of a front nose, side mirrors, a rear bumper, a back door, and an upper part of the windshield of the interior of a vehicle 80. A polarized image acquisition unit 20A provided on the front nose and a polarized image acquisition unit 20B provided on the upper part of the windshield of the interior mainly acquire images in front of the vehicle 80. Polarized image acquisition units 20C and 20D provided on the side mirrors mainly acquire images on the sides of the vehicle 80. A polarized image acquisition unit 20E provided on the rear bumper or the back door mainly acquires images behind the vehicle 80. Note that FIG. 25 illustrates an example of photographic ranges of the respective polarized image acquisition units 20A to 20E. An imaging range ARa indicates the imaging range of the polarized image acquisition unit 20A provided on the front nose, and an imaging range ARb indicates the imaging range of the polarized image acquisition unit 20B provided on the upper part of the windshield of the interior. Respective imaging ranges ARc and ARd indicate the imaging ranges of the polarized image acquisition units 20C and 20D, respectively, provided on the side mirrors, and an imaging range ARe indicates the imaging range of the polarized image acquisition unit 20E provided on the rear bumper or the back door.

Returning to FIG. 24, the outside information detection unit 134 images the surrounding areas of the vehicle and acquires polarized images to generate the reflection information and estimate the position of the viewed object as described above. The outside information detection unit 134 outputs the generated reflection information and the position estimation result of the viewed object to the integrated control unit 140 through the communication network 120.

The wireless communication unit 135 communicates with the outside, such as other vehicles and a management center that manages road conditions and the like, through a wireless communication network, such as DSRC (registered trademark) (Dedicated Short Range Communication), and outputs the received information to the integrated control unit 140. The wireless communication unit 135 also transmits the reflection information and the like acquired by the outside information detection unit 134 to the other vehicles, the management center, and the like. Note that the wireless communication unit 135 may communicate with the management center through a wireless communication network, such as a wireless communication network of a wireless LAN and a wireless communication network for mobile phone like 3G, LTE, or 4G. The wireless communication unit 135 may also receive a signal or the like of a global positioning system (GNSS: Global Navigation Satellite System) to measure the position and output the positioning result to the integrated control unit 140.

The input unit 151, the sound output unit 152, and the display unit 153 are connected to the integrated control unit 140.

The input unit 151 is realized by an apparatus, such as a touch panel, a button, a microphone, a switch, and a lever, that allows the occupant to perform an input operation. The input unit 151 generates an input signal on the basis of the information input by the occupant or the like and outputs the input signal to the integrated control unit 140.

The sound output unit 152 outputs sound based on a sound signal from the integrated control unit 140 to audibly send information to the occupant of the vehicle. The display unit 153 displays images on the basis of image signals from the integrated control unit 140 and visually sends information to the occupant of the vehicle.

The integrated control unit 140 includes a CPU (Central Processing Unit), a ROM (Read Only Memory), a RAM (Random Access Memory), and the like. The ROM (Read Only Memory) stores various programs executed by the CPU (Central Processing Unit). The RAM (Random Access Memory) stores information, such as various parameters, results of operation, and sensor values. The CPU executes various programs stored in the ROM to control the overall operation in the vehicle control system 100 according to input signals from the input unit 151, information acquired by communication with each of the control units, the detection units, and the wireless communication unit through the communication network 120, information stored in the RAM, and the like. The integrated control unit 140 also generates a sound signal indicating information to be audibly sent to the occupant of the vehicle and outputs the sound signal to the sound output unit 152. The integrated control unit 140 generates an image signal for visually sending information to the occupant of the vehicle and outputs the image signal to the display unit 153. The integrated control unit 140 also uses the wireless communication unit 135 to communicate with various devices outside of the vehicle, such as other vehicles and a management center. The integrated control unit 140 also supports the drive of the vehicle on the basis of map information stored in the ROM or the RAM and the positioning result acquired from the wireless communication unit 135.

Note that in the example illustrated in FIG. 24, at least two control units connected through the communication network 120 may be integrated into one control unit. Alternatively, individual control units may be constituted by a plurality of control units. Furthermore, the vehicle control system 100 may include other control units not depicted. Other control units may have part or all of the functions of any of the control units in the description. More specifically, any control unit may execute predetermined arithmetic processing as long as information is transmitted and received through the communication network 120.

In a case where the information acquisition apparatus is applied to the vehicle control system, the information of the viewed object positioned in the area of the blind spot of the driver can be provided to the driver. For example, in a case where the display unit 153 displays an image of the viewed object positioned in the area of the blind spot on the basis of the reflection information generated by the outside information detection unit 134, a motorcycle, a bicycle, or the like hidden behind the oncoming car can be checked, and a collision with the motorcycle, the bicycle, or the like can be prevented during the turn. A vehicle, a person, or the like positioned behind a building or the like can also be checked, and this allows to predict the vehicle or the person rushing out.

Furthermore, the drive system control unit 131 and the integrated control unit 140 may control the drive of the vehicle on the basis of the position of the viewed object estimated by the outside information detection unit 134. For example, the moving direction and the moving speed of the viewpoint object are determined from the change in the position of the viewed object, and in a case where there is a possibility of a collision with the vehicle, the steering, the brake, and the like are controlled to perform an evasive action. In this way, the reflection components can be used for safe driving. Note that in a case where the information acquisition apparatus is applied to the vehicle control system, the amount of movement of the polarized image acquisition unit in the fourth embodiment can be calculated by using the detection result of the vehicle state detection unit 1311 or information of a positioning system (not depicted) provided on the vehicle control system.

Furthermore, the information of the building or the like including the reflective surface may be included in the map information, and the information of the viewed object may be acquired on the basis of the current position indicated by the positioning result and the map information when the vehicle approaches the building including the reflective surface. This allows to execute the process of acquiring the information of the viewed object only in a case where the building including the reflective surface is near the vehicle, and the vehicle control and the like can be efficiently performed.

In addition, reflection information or the like generated by another vehicle may be received by wireless communication, and the reflection information or the like generated by the other vehicle may be used to execute the process of the third embodiment to acquire the information of the viewed object.

Furthermore, a process of transmitting the detected position of the reflective surface area, the information of the building, and the like to the management center by wireless communication and a process of transmitting the reflection information and the like to other vehicles by wireless communication can be executed to construct an efficient transportation system.

In addition, the information acquisition apparatus of the technique may be applied not only to the vehicle control system, but also to a monitoring system. In this case, the image and the position of the viewed object in the area of the blind spot of a monitoring camera can be checked, and the reflection components can be used for efficient monitoring without arrangement of a large number of monitoring cameras for eliminating the blind spot.

Furthermore, the information acquisition apparatus of the technique can be applied not only to the vehicle control system and the monitor system, but also to various fields in which the viewed object in the area of the blind spot or the like needs to be determined.

In addition, the series of processes described in the specification can be executed by hardware, software, or an integral configuration of hardware and software. In a case where the process by the software is to be executed, the process is executed by installing a program recording the processing sequence on a memory in a computer incorporated into dedicated hardware. Alternatively, the process can be executed by installing the program on a general-purpose computer that can execute various processes.

For example, the program can be recorded in advance in a hard disk, an SSD (Solid State Drive), or a ROM (Read Only Memory) as a recording medium. Alternatively, the program can be temporarily or permanently stored (recorded) in a removable recording medium, such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, and a semiconductor memory card. The removable recording medium can be provided as so-called package software.

Furthermore, the program may be installed on the computer from the removable recording medium or may be transferred from a download site to the computer wirelessly or by a cable, through a network such as a LAN (Local Area Network) and the Internet. The computer can receive the transferred program and install the program on a recording medium such as a built-in hard disk.

Note that the advantageous effects described in the present specification are exemplary only and not limiting, and there can be additional advantageous effects not described. Furthermore, the present technique should not be construed as being limited to the embodiments of the technique. The present technique is disclosed by the embodiments of the technique in exemplary modes, and it is obvious that those skilled in the art can modify or substitute the embodiments without departing from the scope of the present technique. More specifically, the claims should be taken into consideration to determine the scope of the present technique.

Furthermore, the information acquisition apparatus of the present technique can also be configured as follows.

(1) An information acquisition apparatus including:
a reflection information generation unit that generates reflection information indicating reflection components from polarized images in a plurality of polarization directions; and
a reflection information using unit that uses the reflection information to acquire information of a viewed object appearing in the polarized images.

(2) The information acquisition apparatus according to (1), in which
the reflection information includes a reflection image.

(3) The information acquisition apparatus according to (2), in which
the reflection information generation unit sets a concentrated area with a degree of polarization equal to or greater than a threshold as a reflective surface area and sets an image of the reflective surface area as the reflection image.

(4) The information acquisition apparatus according to (3), in which
the reflection information using unit uses the reflection image to perform object recognition and acquires an image of the recognized viewed object.

(5) The information acquisition apparatus according to (4), in which
the reflection information includes azimuth information of the reflective surface area, and
the reflection information using unit displays a direction of the reflective surface area along with the image of the viewed object on the basis of the azimuth information.

(6) The information acquisition apparatus according to any one of (3) to (5), in which
the reflection information using unit uses a distance of the reflective surface area estimated from polarized images from a plurality of viewpoints and the reflection information of the reflective surface area generated by the reflection information generation unit to acquire a position of the viewed object appearing in the reflective surface area.

(7) The information acquisition apparatus according to (6), further including:
a depth estimation unit that estimates the distance of the reflective surface area on the basis of the polarized images from the plurality of viewpoints.

(8) The information acquisition apparatus according to (7), in which
the depth estimation unit uses images excluding reflection components from the polarized images from the plurality of viewpoints to estimate the distance of the reflective surface area.

(9) The information acquisition apparatus according to any one of (6) to (8), in which
the reflection information using unit uses reflection information of the corresponding viewed object in a corresponding reflective surface area from the plurality of viewpoints and a distance of the corresponding reflective surface area to acquire the position of the corresponding viewed object.

(10) The information acquisition apparatus according to any one of (3) to (5), in which
the reflection information using unit uses a distance of each of a plurality of reflective surface areas and reflection information of each of the plurality of reflective surface areas generated by the reflection information generation unit to acquire the position of the viewed object appearing in the plurality of reflective surface areas.

(11) The information acquisition apparatus according to any one of (3) to (5), in which
the reflection information using unit uses the distance of the reflective surface area at each of a plurality of points in time and the reflection information of the reflective surface area at each of the plurality of points in time generated by the reflection information generation unit to acquire the position of the viewed object appearing in the reflective surface areas at the plurality of points in time.

(12) The information acquisition apparatus according to (11), in which
a polarized image acquisition unit that acquires the polarized images including the reflective surface area moves with time to acquire the polarized images at the plurality of points in time, and
the reflection information using unit uses the distance of the reflective surface area with the position of the polarized image acquisition unit at a predetermined point in time as a reference, the position of the polarized image acquisition unit at a point in time different from the predetermined point in time with respect to the position of the polarized image acquisition unit at the predetermined point in time, and the reflection information of the reflective surface area at each of the plurality of points in time generated by the reflection information generation unit to acquire the position of the viewed object appearing in the reflective surface areas at the plurality of points in time.

(13) The information acquisition apparatus according to (11), in which
the reflective surface area moves with time, and
the reflection information using unit uses the distance of the reflective surface area at each of the predetermined points in time and the reflection information of the reflective surface area at each of the plurality of points in time generated by the reflection information generation unit to acquire the position of the viewed object appearing in the reflective surface areas.

INDUSTRIAL APPLICABILITY

According to the information acquisition apparatus and the information acquisition method of the technique, the reflection information generation unit generates the reflection information indicating the reflection components from the polarized images in a plurality of polarization directions. Furthermore, the reflection information using unit uses the reflection information to acquire the information of the viewed object appearing in the polarized images. Therefore, the reflection components can be used from the images of the surrounding area to easily check the viewed object positioned in, for example, an area of a blind spot. This is suitable for a system, such as a vehicle control system and a monitoring system, that can preferably check the viewed object in the area of the blind spot.

REFERENCE SIGNS LIST

10 . . . Information acquisition apparatus
20, 20-1, 20-2, 20A to 20E . . . Polarized image acquisition unit
30, 30-1, 30-2 . . . Reflection information generation unit
40 . . . Reflection information using unit
50, 51 . . . Depth estimation unit
60, 61, 62 . . . Position estimation unit
80 . . . Vehicle
100 . . . Vehicle control system
120 . . . Communication network
131 . . . Drive system control unit
132 . . . Body system control unit
133 . . . Battery control unit
134 . . . Outside information detection unit
135 . . . Wireless communication unit
140 . . . Integrated control unit
151 . . . Input unit
152 . . . Sound output unit
153 . . . Display unit

The invention claimed is:

1. An information acquisition apparatus comprising:
processing circuitry configured to:
generate reflection information indicating reflection components from polarized images in a plurality of polarization directions; and
use the reflection information to acquire information of a viewed object appearing in the polarized images,
wherein the reflection information includes a reflection image,
wherein the processing circuitry is configured to set a concentrated area with a degree of polarization equal to or greater than a threshold as a reflective surface area and to set an image of the reflective surface area as the reflection image, and
wherein the processing circuitry is configured to use a distance of the reflective surface area estimated from polarized images from a plurality of viewpoints and the reflection information of the reflective surface area to acquire a position of the viewed object appearing in the polarized images.

2. The information acquisition apparatus according to claim 1, wherein
the processing circuitry is configured to use the reflection image to recognize the viewed object and to acquire an image of the recognized viewed object.

3. The information acquisition apparatus according to claim 2, wherein
the reflection information includes azimuth information of the reflective surface area, and
the processing circuitry is configured to display a direction of the reflective surface area along with the image of the recognized viewed object on the basis of the azimuth information.

4. The information acquisition apparatus according to claim 1,
wherein the processing circuitry is further configured to estimate the distance of the reflective surface area based on the polarized images from the plurality of viewpoints.

5. The information acquisition apparatus according to claim 4, wherein
processing circuitry is configured to use images excluding reflection components from the polarized images from the plurality of viewpoints to estimate the distance of the reflective surface area.

6. The information acquisition apparatus according to claim 1, wherein
the processing circuitry is configured to use reflection information of a corresponding viewed object in a corresponding reflective surface area from the plurality of viewpoints and a distance of the corresponding reflective surface area to acquire the position of the corresponding viewed object.

7. An information acquisition apparatus comprising:
processing circuitry configured to:
generate reflection information indicating reflection components from polarized images in a plurality of polarization directions; and
use the reflection information to acquire information of a viewed object appearing in the polarized images,
wherein the reflection information includes a reflection image,
wherein the processing circuitry is configured to set a concentrated area with a degree of polarization equal to or greater than a threshold as a reflective surface area and to set an image of the reflective surface area as the reflection image, and
wherein the processing circuitry is configured to use a distance of each of a plurality of reflective surface areas and reflection information of each of the plurality of reflective surface areas to acquire a position of the viewed object appearing in the polarized images.

8. An information acquisition apparatus comprising:
processing circuitry configured to:
generate reflection information indicating reflection components from polarized images in a plurality of polarization directions; and
use the reflection information to acquire information of a viewed object appearing in the polarized images,
wherein the reflection information includes a reflection image,
wherein the processing circuitry is configured to set a concentrated area with a degree of polarization equal to or greater than a threshold as a reflective surface area and to set an image of the reflective surface area as the reflection image, and
wherein the processing circuitry is configured to use a distance of the reflective surface area at each of a plurality of points in time and reflection information of the reflective surface area at each of the plurality of points in time to acquire a position of the viewed object appearing in the polarized images at the plurality of points in time.

9. The information acquisition apparatus according to claim 8, wherein the processing circuitry is configured to:
acquire the polarized images including the reflective surface area moves with time to acquire the polarized images at the plurality of points in time, and
use the distance of the reflective surface area with a position at which the polarized images are acquired at a predetermined point in time as a reference, the position at which the polarized images are acquired at a point in time different from the predetermined point in time with respect to the position at which the polarized images are acquired at the predetermined point in time, and the reflection information of the reflective surface area at each of the plurality of points in time to acquire the position of the viewed object appearing in the reflective surface areas at the plurality of points in time.

10. The information acquisition apparatus according to claim 8, wherein
the reflective surface area moves with time, and
the processing circuitry is configured to use a distance of the reflective surface area at each of the predetermined points in time and the reflection information of the reflective surface area at each of the plurality of points in time to acquire the position of the viewed object appearing in the reflective surface areas.

11. An information acquisition method comprising:
generating, by processing circuitry, reflection information indicating reflection components from polarized images in a plurality of polarization directions; and
acquiring, by the processing circuitry, information of a viewed object appearing in the polarized images by using the reflection information,
wherein the reflection information includes a reflection image,
wherein a concentrated area with a degree of polarization equal to or greater than a threshold is set as a reflective surface area and an image of the reflective surface area is set as the reflection image, and
wherein a distance of the reflective surface area estimated from polarized images from a plurality of viewpoints and the reflection information of the reflective surface area are used to acquire a position of the viewed object appearing in the polarized images.

* * * * *